United States Patent
Rajagopal et al.

(10) Patent No.: US 12,481,723 B2
(45) Date of Patent: Nov. 25, 2025

(54) INTELLIGENT DATA RANKING SYSTEM BASED ON MULTI-FACET INTRA AND INTER-DATA CORRELATION AND DATA PATTERN RECOGNITION

(71) Applicant: Accenture Global Solutions Limited, Dublin (IE)

(72) Inventors: Vidya Rajagopal, Bangalore (IN); Marin Grace, Bangalore (IN); Amritendu Majumdar, Mumbai (IN); Sunjeet Gupta, Pune (IN); Matthew D. LeClaire, Chicago, IL (US); Jeff Ivany, Powell, OH (US)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 826 days.

(21) Appl. No.: 17/833,455

(22) Filed: Jun. 6, 2022

(65) Prior Publication Data
US 2023/0394115 A1 Dec. 7, 2023

(51) Int. Cl.
*G06N 20/00* (2019.01)
*G06F 18/2113* (2023.01)
*G06F 18/22* (2023.01)
*G06F 18/23213* (2023.01)
*G06N 3/08* (2023.01)

(52) U.S. Cl.
CPC .... *G06F 18/23213* (2023.01); *G06F 18/2113* (2023.01); *G06F 18/22* (2023.01)

(58) Field of Classification Search
CPC .......... G06F 18/23213; G06F 18/2113; G06F 18/22; G06Q 30/0201; G06Q 30/0269; G06Q 30/0282
See application file for complete search history.

(56) References Cited

U.S. PATENT DOCUMENTS

| | | |
|---|---|---|
| 10,127,596 B1 | 11/2018 | Franke et al. |
| 10,157,411 B1 | 12/2018 | Vasishta |
| 10,521,824 B1 | 12/2019 | Boshy et al. |
| 2004/0236725 A1* | 11/2004 | Amitay ............... G06F 16/3338 |
| 2014/0180790 A1* | 6/2014 | Boal ................. G06Q 30/0245 |
| | | 705/14.42 |

(Continued)

OTHER PUBLICATIONS

Extended European Search Report of European application 23170362.0, dated Nov. 15, 2023, 10 pages (Continued)

*Primary Examiner* — Jordany Nunez
(74) *Attorney, Agent, or Firm* — Mannava & Kang, P.C.

(57) ABSTRACT

This disclosure is directed generally to an automatic intelligent electronic data processing system, platform, and method for computerized multi-facet data pattern recognition and ranking, and particularly to intelligently personalizing recommendation of data items for consumption by a particular entity based on past data consumption history of the entity and/or other entities via machine recognition of intra and/or inter-entity data item selection correlations. Such personalized recommendation may be based on a multi-facet ranking of the data items by integrating various intra-entity and inter-entity correlations and patterns in data item consumption into a quantifiable entity-specific ranking score for each data item that may potentially be selected for consumption by a particular entity.

20 Claims, 6 Drawing Sheets

(56) References Cited

U.S. PATENT DOCUMENTS

| | | | |
|---|---|---|---|
| 2019/0179915 A1 | 6/2019 | Yoon et al. | |
| 2021/0061471 A1* | 3/2021 | Bates | G06Q 30/0255 |
| 2021/0192531 A1* | 6/2021 | Pearson | G07G 1/14 |
| 2021/0357378 A1* | 11/2021 | Urdiales | G06N 3/08 |
| 2024/0346029 A1* | 10/2024 | Neumann | G06F 16/24575 |
| 2025/0139720 A1* | 5/2025 | Vishnikin | G06Q 30/0623 |

OTHER PUBLICATIONS

Intellectual Property Office of India, First Examination Report, IN Patent Application No. 202344031221, dated Apr. 11, 2025, 10 pages.

* cited by examiner

INTELLIGENT DATA RANKING SYSTEM BASED ON MULTI-FACET INTRA AND INTER-DATA CORRELATION AND DATA PATTERN RECOGNITION

BACKGROUND

Technical Field

This application relates generally to a system and method for intelligent multi-facet data pattern recognition and ranking by computers.

Background Technologies

In many circumstances, data items from a data item pool (or data pool) may be selectively consumed by a same entity or a plurality of entities on a regular basis. Each time, a different set of data items may be selected by an entity. A data item selection may be context dependent, e.g., it may depend on a time and location at which the data selection is being made, and may further depend on other factors. Data item correlations or distribution patterns may exist between the data item selections for each particular entity (e.g., intra-entity correlations), or between data selections made by different entities (e.g., inter-entity correlations), and/or in other manners. Such correlations or distribution patterns may be embedded and hidden in historical data selection occurrences, and may be extracted and used to predict data items that may likely be selected by a particular entity in a future time.

BRIEF SUMMARY

The disclosure below is directed generally to an automatic intelligent electronic data processing system, platform, and method for computerized multi-facet data pattern recognition and ranking, and particularly to intelligently personalizing recommendation of data items for consumption by a particular entity based on past data consumption history of the entity and/or other entities via machine recognition of intra and/or inter-entity data item selection correlations. Such personalized recommendation may be based on a multi-facet ranking of the data items by integrating various intra-entity and inter-entity correlations and patterns in data item consumption into a quantifiable entity-specific ranking score for each data item that may potentially be selected for consumption by a particular entity.

In some example implementations, a system for data ranking and personalized recommendation is disclosed. The system may include comprising a memory circuitry for storing computer instructions; a network interface circuitry; and a processor in communication with the network interface circuitry and the memory circuitry. The processor may be configured to execute the computer instructions to retrieve a plurality of lists, each of the plurality of lists being associated with a selection event and comprising a set of data items among a data item pool selected by one of a plurality of entities for the selection event; generate, independent of identities of the plurality of entities, a cluster representation of the plurality of lists, based on a computerized pattern recognition algorithm; extract a subset of the plurality of lists associated with a target entity to form a target list set; automatically generate a ranking of one or more data items in the data item pool based on the cluster representation and the target list set; and automatically generate a recommendation among the one or more data items for the target entity based on the ranking.

DETAILED DESCRIPTION

Figure 1:
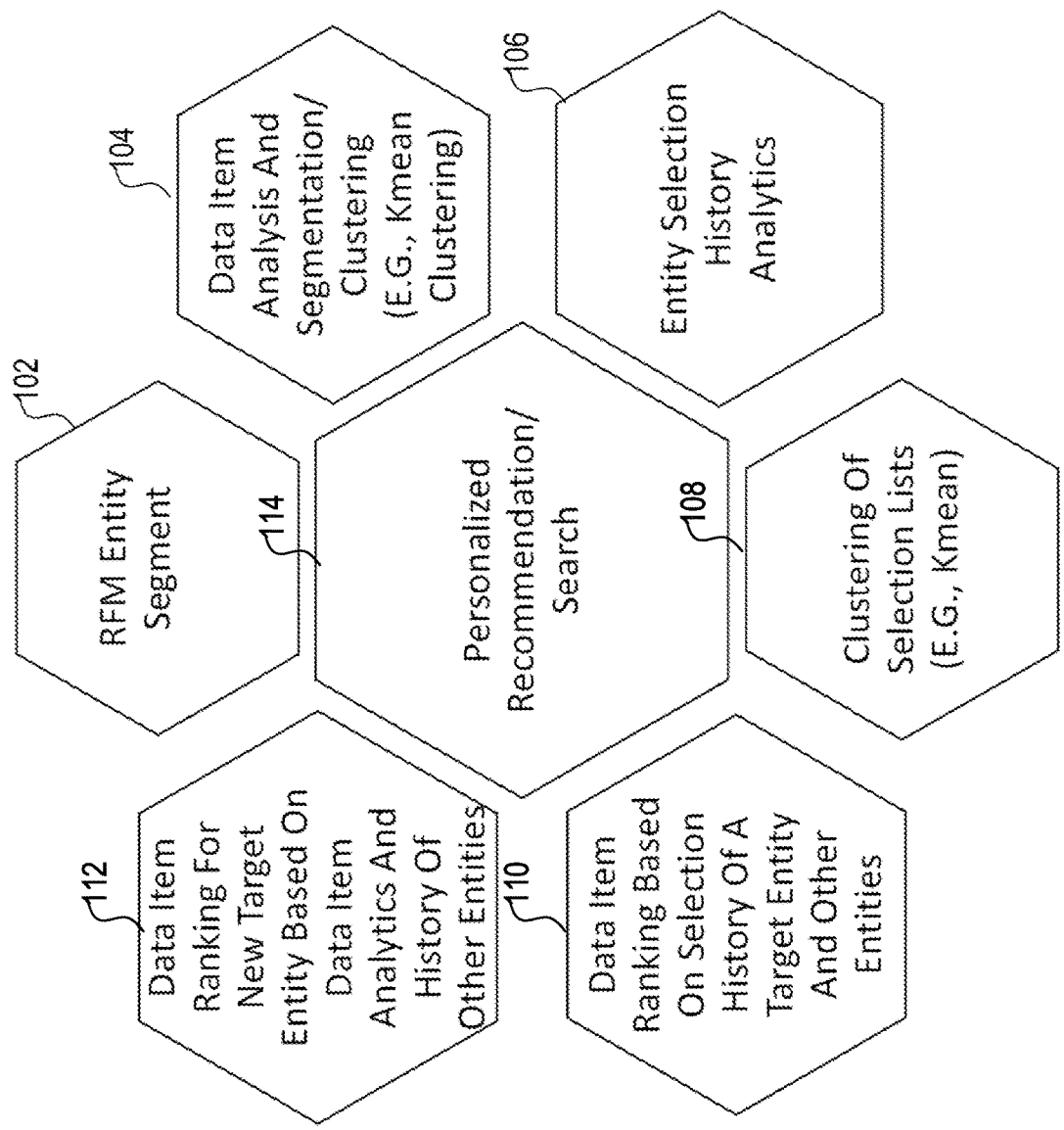
FIG. 1 illustrates function blocks for an example intelligent system for personalized data item recommendation and search.

This system will now be described in detail hereinafter with reference to the accompanied drawings, which form a part of the present disclosure, and which show, by way of illustration, various example implementations and embodiments. The system may, however, be embodied in a variety of different forms and, therefore, the disclosure herein is intended to be construed as not being limited to the embodiments set forth. Further, the disclosure may be embodied as methods, devices, components, systems, and/or platforms. Accordingly, embodiments of the disclosure may, for example, take the form of hardware, software, firmware or any combination thereof.

In general, terminology may be understood at least in part from usage in its context. For example, terms, such as "and", "or", or "and/or," as used herein may include a variety of meanings that may depend at least in part upon the context in which such terms are used. Typically, the term "or", if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for the existence of additional factors not necessarily expressly described, again, depending at least in part on context.

In many applications, data items from a data item pool (or data pool) may be selectively consumed by a same entity or a plurality of entities on a regular basis. Each time, a different set of data items may be selected by an entity. A data item selection may be context dependent, e.g., it may depend on a time and location at which the data selection is being made, and may further depend on other factors. Data item correlations or distribution patterns may exist between the data item selections for each particular entity (e.g., intra-entity correlations), or between data selections made by different entities (e.g., inter-entity correlations), and/or in other manners. Such correlations or distribution patterns may be embedded and hidden in historical data selection occurrences, and may be extracted and used to predict data items that may likely be selected by a particular party in a future time.

In an example application, the pool of data items may include a collection of menu items of a restaurant or shop, or a chain of restaurants, restaurant franchise locations, or shops (herein generally referred to as "restaurants"). The menu items may be accessed electronically online at the restaurant locations or remotely. The menu items may be organized in food/beverage categories (e.g., appetizers, entrees, drinks, disserts, and the like). These menu items may be selected by a customer for an order. There may be a plurality of customers who electronically order from the restaurant. Each order may include a set of menu items selected from the menu item pool. Each item may be associated with a quantity, and optionally, a size and/or other attributes. Each order may be further associated with contextual information such as the time, the day of the week, and the date when the order is placed, the weather condition at the time the order is placed, the geographic location from which the order is placed, and the like. All such information may be tracked online by a back-end server as described in further detail below. Each order may be associated with a customer. The identity of each of the customers of the orders may be tracked, via, for example, customer IDs of online customer accounts. Each existing customer may have historically placed one or more orders. Each order may be alternatively referred to as a list, a selection list, a data item selection list, an order, or an order list. A selection list thus may contain a number of menu items ordered or selected from the pool of menu items for a particular order event or selection event, and may be associated with a set of context or contextual information.

In the example application above and other similar applications, an interactive online user interface may be provided to a customer, herein alternatively referred to as a target entity, to place an order by selecting a set of data items from the pool of data items available for selection. Rather than providing and displaying the entire pool of data items, either as a whole or as hierarchical interactive menus, only a subset of the data items may be displayed for the target entity for inspection and selection, thereby avoiding crowdedness and confusion on the user interface. Such subset of data items may be presented as a reduced menu. Further, a number of data items may be recommended (referred to as a recommendation or a recommendation list). As described in the various implementations below, such menu reduction and/or data item recommendation may be intelligently and predictively determined in a personalized and adaptive manner for the target entity. The personalization and adaptation may be based on information pertaining to the target entity and/or correlation between the data items as established and automatically recognized from historical orders by a plurality of entities (or customers).

As one example in the disclosure below, an automatic intelligent electronic data processing system, platform, and method for multi-facet data pattern recognition and ranking are described, particularly for intelligently recommending data items for consumption by a particular entity in a personalized manner based on past data consumption history of the entity and/or other entities via machine recognition of intra and/or inter-entity correlations and data item consumption patterns. Such personalized recommendation may be based on a multi-facet ranking of the data items by integrating various intra-entity and inter-entity correlations and patterns in data item consumption into a quantifiable entity-specific ranking score for each data item that may potentially be selected for consumption by a particular entity. The data item ranking and recommendation process may be prompted by a user who may or may not have existing history of past data item selections. The system or platform disclosed herein may be configured in a form of recommendation engine or a search engine for data items in communication with a personalized interactive user interface.

The disclosure below adopts various machine learning and artificial intelligence (AI) techniques for segmentation, clustering, and for pattern recognition in data items which are inherent in electronic computing platforms and are only suitable for computerized implementations. The disclosed analytics processes are not considered as trackable by human mind through mental processes. The outcome of the data pattern recognition includes signals that identify a set of recommended data items or search results that are ordered by electronically evaluated ranking scores.

While the various implementations below are described in the context of the restaurant application, the underlying principles nevertheless apply to other ecommerce applications, and many additional other similar and analogues circumstances. The recommendation adapted to each target entity represents a form of personalization achieved using artificial intelligence which helps retain users or customers. In essence, the disclosure below describes generic AI based data processing engines using a unique novel multi-layer and weight-based personalization and ranking mechanism which various components including but not limited to entity/customer segmentations/clustering based on multi-layer Recency-Frequency-Monetary value (RFM) analytics, segmentation/clustering of data items based on historical data item selections for consumption, and segmentation/clustering of data item selections or data item selection lists. Self-learning models based on the effectiveness of the personalization and recommendation are further included to improve the adaptability of the system. The implementations describe herein, for example, are applicable to recommendation based on data item search data as well as order data, provided that historical search data is captured. The artificial intelligence aspect of the implementations. May be applied to, for example, a majority of retail online applications including but not limited to quick service grocery and clothing stores, movie recommendation, and other content personalization and recommendation applications.

FIG. 1 shows a high-level functional block diagram of an example intelligent data processing system for personalized data item recommendation and/or searching. The various functional blocks may include but are not limited to RFM segmentation 102, data item analytics and segmentation (or clustering) 104, entity data item selection history analytics 106, and data item selection list clustering 108. The input for these functional blocks may include but is not limited to historical data item selections by various entities with context information associated therewith. The output of these functional blocks may include but is not limited to segmented/clustered data items, segmented/clustered data item selection lists, and statistical features of data item selections of various entities. Such output may be further processed by the data item ranking functional block 110 in a personalized manner for a particular target entity having data item selection history to generate an adaptive or personalized ranking of data items for the target entity. A subset of such output may also be processed by another data item ranking functional block 112 for a target user having no prior data item selection history. Finally, the example intelligent data processing system may include a recommendation and search functional block 114 for generating personalized recommendation of data items or search results responsive to user query, either context-aware or context-free.

Figure 2:
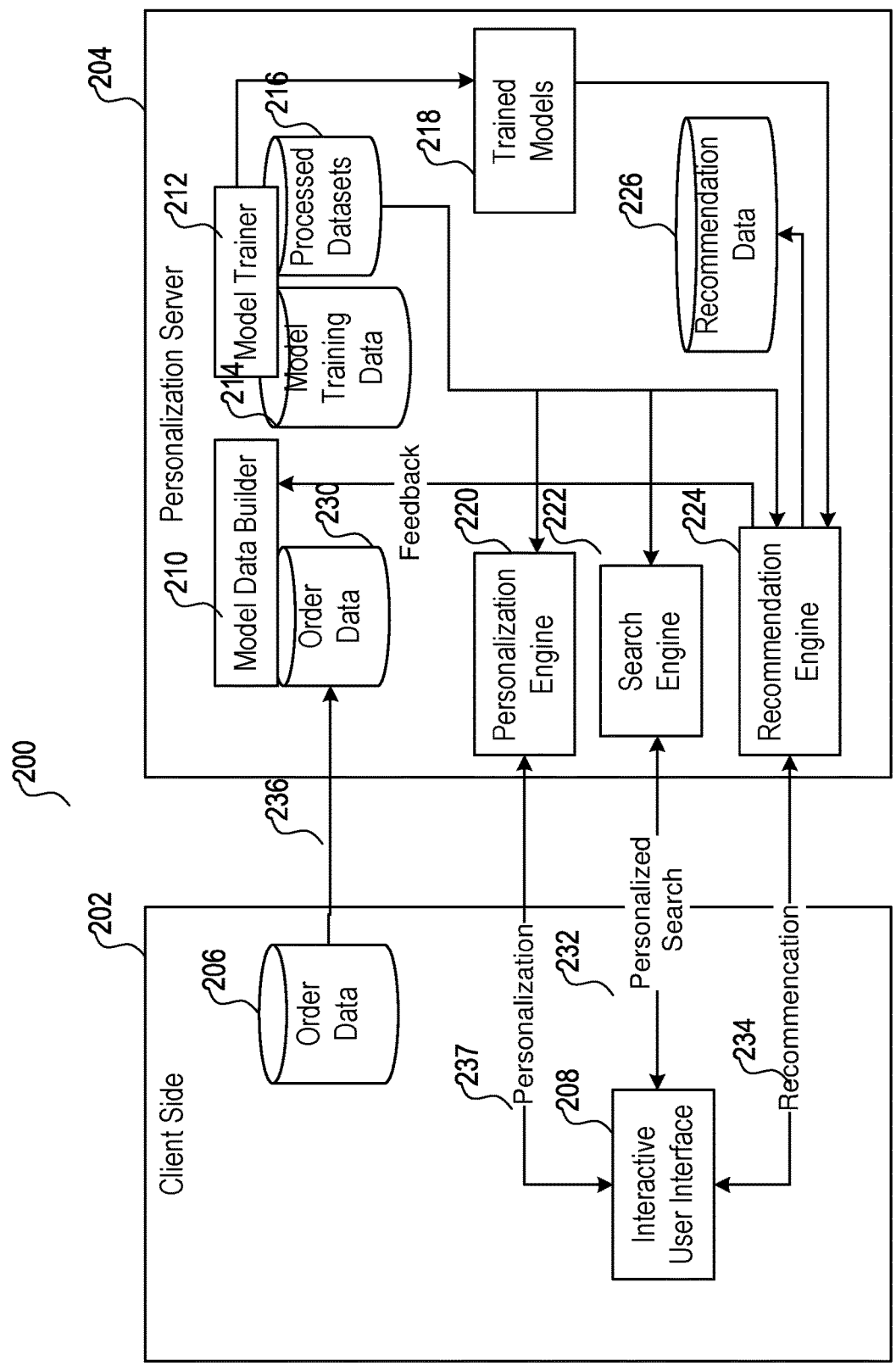
FIG. 2 shows an example client-server architecture for implementing the intelligent system of FIG. 1 for personalized data item recommendation and search.

FIG. 2 shows an example implementation for segregating the various functions above into a client-side (or front-end) portion 202 and a server-side (or back-end) portion 204, alternatively referred to as a front-end and back-end of the intelligent data processing system 200, in the context of menu data item personalization for a Quick-Service Restaurant (QSR). The front-end 202 and the back-end 204 of the example intelligent data processing system for personalized data item recommendation and/or searching may communicate with one another via any types of wireline or wireless communication networks. Such communications may be continuous and in real-time or near-real-time. In other words, the front-end 202 and the back-end side 204 may be in synchronized or periodic communication.

As further shown in FIG. 2, the front-end 202 may be responsible for monitoring and keeping track of electronic orders and data item selections from customer entities. Each order may be stored as a list of data items selected by an entity from a pool of data items. The pool of data items may include various menu items of the QSR. Each order or data item selection list may be associated with a set of context information, including but not limited to the time, the day of the week, and the date when the order is placed, the weather condition at the time the corresponding order was placed, the geographic location from which the corresponding order was placed, location or identity of the physical QSR (particularly when the QSR is only one of many QSRs of a QSR chain), and the like. Historical orders may be stored in the front-end, as shown by 206 in FIG. 2.

The front-end 202 in FIG. 2 may be further configured to provide an interactive user interface for access by customers, as shown by 208. Customers may use the interactive user interface 208 for electronically selecting order items and placing orders. The interactive user interface 208 may be accessed remoted. For example, a customer may access the interactive user interface 208 from a location remote to the actual physical location of the QSR (e.g., when ordering a delivery or carry out order).

In accordance with the introduction above, the interactive user interface 208 may be personalized with respect to the customers. As such, the interactive user interface 208 may be configured to recognize each individual customer and to associate a unique identification with each individual customer when they access the interactive user interface 208, so as to achieve a personalized and adaptive service. Specifically, and as described in further detail below, a particular customer may be recognized when accessing the interactive user interface. A personalized menu may be intelligently constructed and presented to the identified customer. Alternatively or additionally, one or more data items from the pool of data items may be recommended for selection by the back-end 204 in manners described below to a particular customer, as shown by arrow 234.

In some example implementations, the interactive user interface 208 may be alternatively or additionally configured to provide a search function for searching for data items among the pool of data items. The data that informs a personalized menu or constitutes data item recommendation/suggestion may be provided from the back-end 204 of the system, as shown by arrow 237. When a search is carried out, an adaptive and personalized search may be performed and with the search results being returned from the back-end 204 to the front-end 202 for display in the interactive user interface, as shown by arrow 232. The search may be performed with or without context information, as also shown by arrow 232. For context-based searches, the context information described above may be provided by front-end 202 to the back-end 204, as also shown by arrow 232.

As also shown in FIG. 2, the back-end 204, alternatively referred to a personalization server, may include various components configured to generate personalization information with respect to particular customers, and communicate such information to the front-end 202, as indicated by arrows 237, 232, and 234. The back-end 204 may be configured to synchronously or periodically receive orders or lists of data item selections as they are placed by the customers and tracked by the front-end 202, as shown by arrow 236. The lists of data item selections may be organized and stored in a historical data item selection list database 230 together with their contextual information as described above. The information contained in the data item selection lists may be stored in various suitable forms.

Table 1 shows an example form in which a portion of historical data item selections are organized and stored in the back-end 204. In the example of Table 1, the historical data item selections may be stored data-item by data-item. Each historically selected data item may be included as a record in the historical data item selection database 230. Each record thus may be associated with a data item among the data item pool that was selected during a particular data item selection event. In the QSR context, each data item selection event corresponds to, for example, an order. As such, each record of data item selection as shown in Table 1 is associated with, for example, a data item identifier or name (column "PRODUCT NAME"), an order identifier (column "ORDER ID"), a customer or entity identifier (column "CUSTOMER ID"), ordered quantity of the data item (column "QUANTITY"), price of the data item (column "UNIT PRICE"), date and time of the order (column "ORDRE DATE/TIME"), and the branch identifier of the QSR when the QSR is a chain (column "BRANCH ID").

TABLE 1

| CUSTOMER ID | ORDER ID | ORDER DATE/TIME | BRANCH ID | QUANTITY | PRODUCT NAME | UNIT PRICE |
|---|---|---|---|---|---|---|
| 82261743 | 199773010 | Apr. 20, 2021 21:29 | 81181 | 1 | SM Fries | 2.19 |
| 82261743 | 199773010 | Apr. 20, 2021 21:29 | 72008 | 1 | Singl Chz | 8.99 |
| 82261743 | 199318502 | Apr. 19, 2021 20:37 | 76126 | 1 | LG Strw Lemon | 1.2 |
| 82261743 | 199318502 | Apr. 19, 2021 20:37 | 76072 | 1 | Bcntr Dbl | 7.79 |

TABLE 1-continued

| CUSTOMER ID | ORDER ID | ORDER DATE/ TIME | BRANCH ID | QUANTITY | PRODUCT NAME | UNIT PRICE |
|---|---|---|---|---|---|---|
| 82261743 | 199318502 | Apr. 19, 2021 20:37 | 76072 | 1 | Grld Asiago | 10.39 |
| 82735677 | 220911136 | Jun. 6, 2021 20:16 | 81170 | 1 | 5 pc Nugget | 2.29 |
| 82735677 | 220911136 | Jun. 6, 2021 20:16 | 81170 | 1 | SM Fries | 2.19 |
| 82735677 | 220911136 | Jun. 6, 2021 20:16 | 81170 | 1 | Dbl Chz | 10.19 |
| 82735677 | 224625659 | Jun. 14, 2021 19:33 | 75130 | 1 | 5 pc Nugget | 2.29 |
| 82735677 | 224625659 | Jun. 14, 2021 19:33 | 81181 | 1 | Choc Milk | 1.69 |
| 82735677 | 224625659 | Jun. 14, 2021 19:33 | 81170 | 1 | SM Poutine | 1.4 |
| 82765087 | 202859551 | Apr. 27, 2021 19:14 | 75075 | 1 | 5 pc Nugget | 2.29 |
| 82765087 | 202859551 | Apr. 27, 2021 19:14 | 81130 | 1 | LG Fries | 0.65 |
| 82765087 | 202859551 | Apr. 27, 2021 19:14 | 81250 | 1 | Singl Chz | 8.99 |
| 82765087 | 206218756 | May 5, 2021 12:20 | 81130 | 1 | Singl Chz | 8.99 |
| 82765087 | 206218756 | May 5, 2021 12:20 | 81250 | 1 | 5 pc Nugget | 2.29 |
| 82765087 | 206218756 | May 5, 2021 12:20 | 81110 | 1 | LG Fries | 3.99 |

As further shown in Table 1, a same customer may have historically ordered (or selected) data items multiple times (as shown by the records in Table 1 having the same customer ID but different order ID). Each order may include one or more data items (shown by the separate entries in Table 1 with the same customer ID and the same order ID).

Table 1 merely shows representative information that may be recorded for each data item selected in each of the data item selection event. Other contextual or non-contextual information may also be recorded as part of the historical data and may be further utilized by the back-end 204 of FIG. 2 to generate personalization data.

As further shown in FIG. 2, the historical data item selection records may be used to train a set of AI models used for performing recognition of data item patterns, e.g., in data item selection lists associated with each customer, in data item selection lists of a group of customers, and/or between data item selection lists. The training of the AI models may involve a model data builder 210 for extracting and segregating the records in the historical data item selection database 230 at various level (e.g., by data items, by customers, by orders, etc.), thereby generating model training datasets 214 for the training and testing of the various AI models 218. The model training data 214 may be used by a model trainer 212 to generate trained AI models 218 and also to generate processed datasets 216.

The processed datasets 216 and the trained AI models 218 may be utilized in various manners to provide personalized interactive user interface, context-based searches, and personalized data item recommendation. FIG. 2 is merely intended to show some representative implementations. For example, the processed datasets may be generated in a form that may be used for a personalization engine 220 to provide personalization information to the front-end 202, to generate, for example, personalized interactive user interface with personalized menu (as shown by 237). For another example the processed datasets may form a subset of the data item pool as a basis for a personalized search (as shown by 232) by a context-based search engine 222. For yet another example the processed datasets and the trained AI models may be utilized by a recommendation engine 224 to provide recommended data items (as shown by 234) based on recognized intra and inter-correlations and patterns in the data item selection lists.

Figure 3:
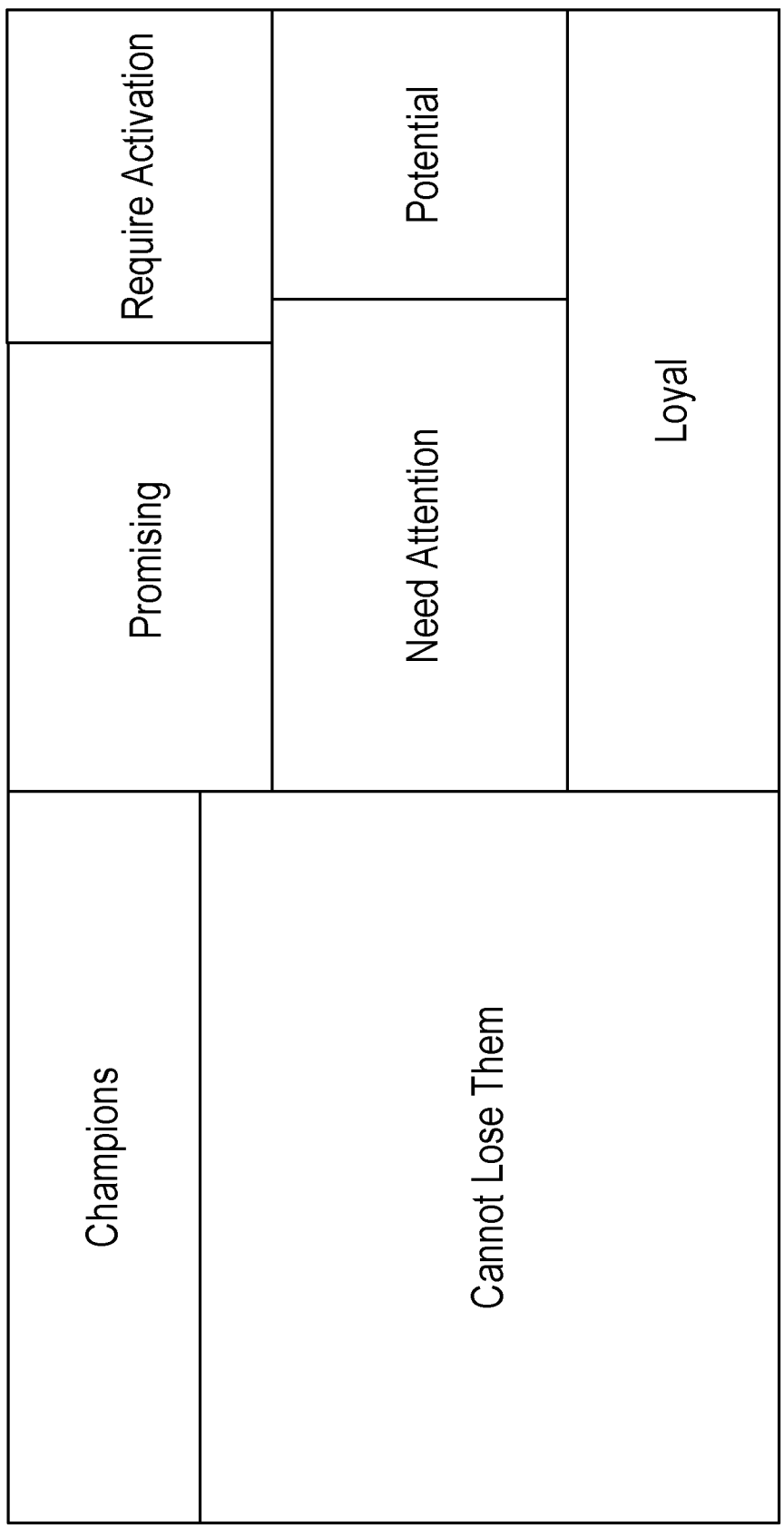
FIG. 3 illustrates an example entity segmentation based on a Recency-Frequency-Monetary value (RFM) analysis algorithm.

In some example implementations, the historical data item selection database 230 may be utilized to generate a segmentation of the customer or entity pool and the segmentation outcome may be stored as a portion of the processed datasets 216. As one example, the segmentation of entities may be based on an RFM analysis. A set of entity segments may be predefined, with an example shown in FIG. 3. Each of the entities in the historical data item selection database 230 may be analyzed to extract a set of characteristic parameters. The set of characteristic parameters, for example, may include a recency parameter, a frequency parameter, and a monetary value parameter. The recency parameter of a particular entity, for example, may represent how recent in time the particular entity has selected data items from the data item pool. The frequency parameter of the particular entity, for example, may represent how often the particular entity has selected or ordered data items. The monetary value parameter of the particular entity, for example, may represent a statistical value of amount of spending by the particular entity (e.g., total historical amount, average amount of order, and the like). These parameters may be converted into recency, frequency, and monetary value scores. In some implementations, such scores may be quantized in to discrete score levels. The recency, frequency, and monetary value scores of each particular entity may then be weighed and combined in an RFM model to determine its RFM segment among the predefined set of RFM segments, such as the ones shown in FIG. 3. The examples below illustrate a determination of RFM segmentation of three example entities according to their recency, frequency, and monetary characteristics that are derived from the datasets stored in the historical data item selection database 230.

Customer ID 82541543: {'Recency': 20, 'Frequency': 80, 'MonetaryValue': 388.47999999999996, 'R': 1, 'F': 3, 'M': 3, 'RFM_Segment_Concat': '1.03.03.0', 'RFM_Score': 7, 'RFM_Level': 'Loyal'}

Customer ID 82545819: {'Recency': 46, 'Frequency': 411, 'MonetaryValue': 1713.9300000000046, 'R': 1, 'F': 4, 'M': 4, 'RFM_Segment_Concat': '1.04.04.0', 'RFM_Score': 9, 'RFM_Level': "Cannot Lose Them"}

Customer ID 82552147: {'Recency': 1, 'Frequency': 242, 'MonetaryValue': 1014.3599999999999, 'R': 4, 'F': 4, 'M': 4, 'RFM_Segment_Concat': '4.04.04.0', 'RFM_Score': 12, 'RFM_Level': "Cannot Lose Them"}

For example, Customer with ID 82541543 has in one past month placed orders with 80 items giving a business of $388.5. The RFM segmentation for the user is a total of 7, with each of the Recency, Frequency, and MonegaryValue dimension quantized into 4 levels with a score of 1-4. The total RFM score is also quantized into, for example, the seven levels shown in FIG. 3. For example, an RFM score equal to or higher than 9 represents "Cannot Lose Them", an RFM score segment between 8 and 9 represents "Champions", an RFM score segment between 7 and 8 represents "Loyals", an RFM score segment between 6 and 7 represents "Potential", an RFM score segment between 5 and 6 represents "promising", an RFM score segment between 4 and 5 represents "Need Attention", and an RFM score segment below 4 represents "Require Activation".

As such, the RFM segmentation information above may be derived for each particular entity and may capture overall characteristics of activities of the particular entity. Such information may be used in various aspects of the personalization of the interactive user interface 208 of FIG. 2 as described above. Such information may not include actual selection of particular data items for each entity. In some example implementations, the actual entity selection information may be additionally captured and stored in the processed datasets 216 of FIG. 2 and used in the personalization process. For example, various statistical characteristics with respect data items selected by each entity may be extracted from the records in the historical data item selection database 230.

In particular, for each entity, popularity of each data item in the data item pool may be extracted. For example, the number of times each data item has been selected by the entity may be extracted and used to characterize an interest level of the entity with respect to the historically selected data items. As such, for each entity, the various data items may be characterized by a personalized popularity measure. Such personal popularity, for example, may be represented by a number of times that a particular data item has been historically selected by the entity.

Figure 4:
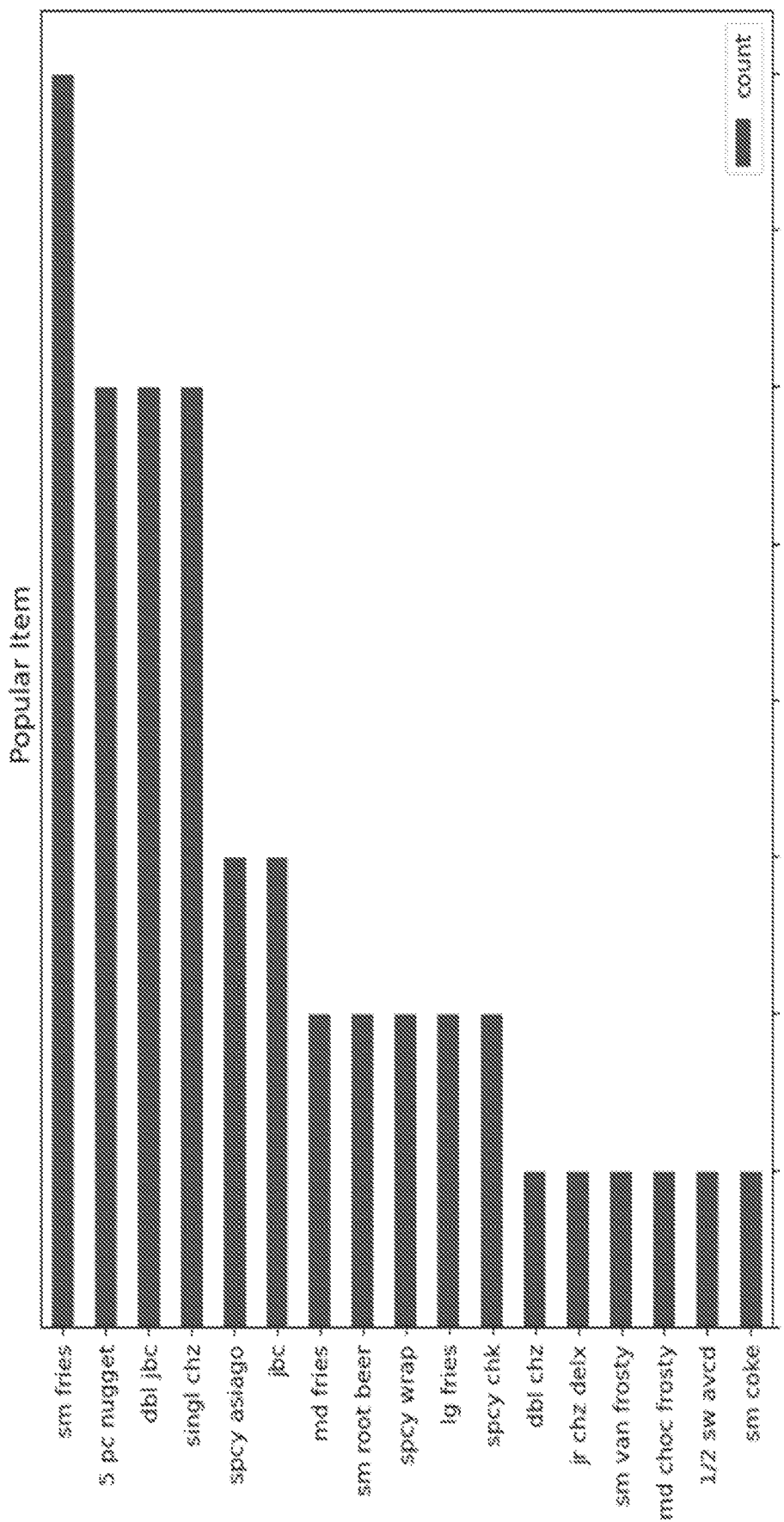
FIG. 4 illustrates an example statistics of data item selections for a particular entity.

The personalized data item popularity therefore may be represented by a dataset in an example form of a sequence of data item-popularity pairs such as [('sm fries', 8), ('5 pc nugget', 6), ('dbl jbc', 6), ('singl chz', 6), ('spcy asiago', 3), ('jbc', 3), ('sm root beer', 2), ('md fries', 2), ('spcy wrap', 2), ('lg fries', 2), ('spcy chk', 2), ('jr chz delx', 1), ('sm van frosty', 1), ('md choc frosty', 1), ('½ sw avcd', 1), ('dbl chz', 1), ('sm coke', 1)]. Such dataset may be updated continuously or periodically within the processed dataset 216 of FIG. 2, and may be graphically represented by the personalized data item popularity chart of FIG. 4. As described in further detail below, such popularity data measure may be utilized in the various personalization processes.

In some example implementations, statistical characteristics of selections of the data items as a whole may also be extracted from the historical data item selection database 230. Such statistical characteristics may be irrespective of the entities who made the selections. For example, popularity of data items across the data item selection lists regardless of the identities of the customers or entities may be determined. Again, such data item popularity may be statistical obtained by extracting the numbers of selections of particular items across data item selection lists and all customers.

Figure 5:
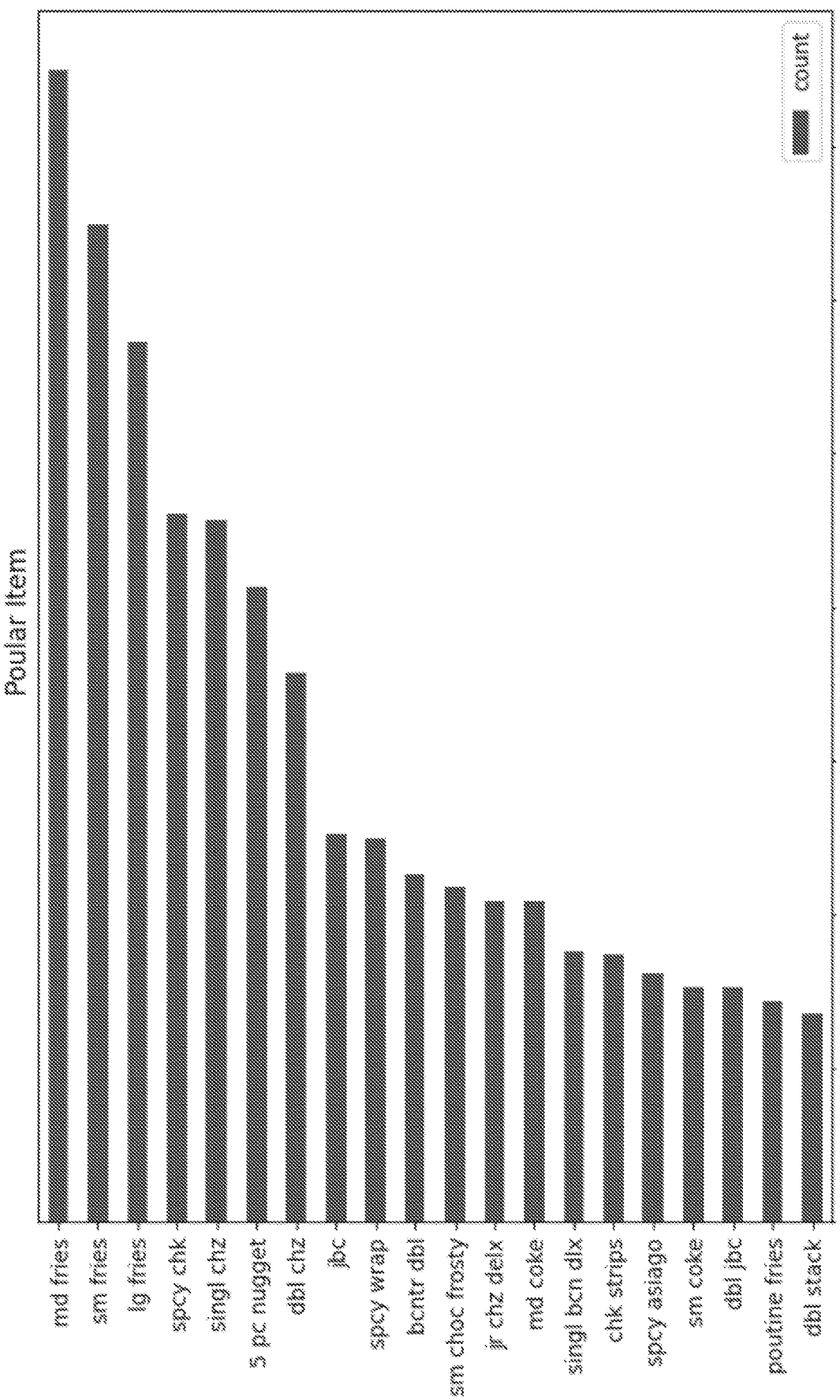
FIG. 5 shows an example statistics of data item selections across various entities.

For a QSR chain having a plurality of locations, such data item statistics may be performed at various levels. For example, it may be performed across all locations. Alternatively or additionally, such statistics may be performed for each site, or a geographic region at various levels. The statistics may be extracted and stored as part of the processed datasets 216 of FIG. 2. An example of data item popularity statistics for a QSR site (or location) is shown in FIG. 5. The data item popularity data so extracted may be stored and tracked in a manner similar to that described above for data item popularity datasets extracted for individual entities. Again, as described in further detail below, these data item popularity datasets tracked as part of the processed datasets 216 may be utilized by various other components of the back-end 204 of FIG. 2 to provide menu personalization, recommendation, and/or search as provided through the interactive user interface 208 of FIG. 2.

In some example implementations, the data items among the data item pool may be segmented into clusters, such clustering may be based on a computerized and intelligent recognition of data item patterns and corrections within historical data item selection lists or between data item selection lists stored in the historical data item selection database 230. The goal of such data item segmentation or clustering is to group like data items together in terms of them being likely to be selected together as a group. The resulting data item clusters may overlap in terms of data items. In other words, a resulting mapping from the data items to the data item clusters may not be one to one in that a particular data item may appear in multiple data item clusters, as an indication or recognition that the particular data item may be likely to be selected with other data items as different groups. A number of data item clusters a particular data item may be in represents, from another perspective, a popularity of the data item.

In some implementations, the data item clustering above may be performed in multiple layers. For example, in a first layer, the data item clustering may be performed regardless of context information. In other higher layers, various levels of context information described above may be taken into consideration. For a context-free first-layer data item clustering, a K-means clustering algorithm may be first used for identifying various centroids of data items in a vector space. For higher layer data item clustering, various combination of contextual information may be incorporated in the vector space for clustering. For example, a second-layer data item clustering may be based on day/time/location contextual information. For another example, a third-layer of data item clustering may be based on weather/time contextual information. For yet another example, a fourth-layer of data item clustering may be based on user data feed and time as context information. The user data feed may include information that the user input via the interactive user interface 208 described in relation to FIG. 2.

Once the data items are clustered via, e.g., K-means clustering algorithm, each item clusters may be tagged with other data items that are frequently selected together with the data items in a particular cluster to form a final data item cluster (which is expanded from the K-means cluster as a result of the tagging process). The final data item clusters, thus may contain overlapping data items because of the tagging process.

An excerpt of an example first-layer final clustering is shown below, representing data items that may be potentially selected together from various aspects:

Cluster 0—chili wrap chz_nacho fruitopia fries dt_coke
Cluster 1—hamb_deluxe wrap fruitopia fries dt_coke decaf
Cluster 2—toy wrap chz_fry fruitopia fries dt_coke The various layers of data item clustering outcome may be stored as part of the processed datasets 216. Each cluster of data items may be given a category name. such categories or clustering scheme represents how the data items in the data item pool may be selected together. These categories are distinct from the data items categories or group normally used for organizing these data items in a menu (e.g., kids meal category, soft drink category, etc.).

In some example implementations, the data item selection lists as extracted from the historical data item selection database 230 of FIG. 2 may be segmented or clustered and the segmentation or clustering outcome may be stored as part of the processed datasets 216 and used to generate personalized menu, data item recommendation, and to assist in context-based searches. Such segmentation or clustering processes data in unit of data item selection lists. In other words, each data item selection list (or a QSR order) is considered as an indivisible whole. The goal for such clustering is to group similar data item selection lists together into a cluster and use such grouping information as at least one of the factors in assisting personalized menu, personalized recommendation of data items, and contextual search.

Such clustering, again, may be performed based on a K-means algorithm. For example, each data item selection list may be considered as a whole. All data item selection lists may be input in the K-means algorithm, which segments the data items selection lists into data item selection list clusters. Each data item selection list cluster may include one or more data item selection lists that are considered alike by the K-mean algorithms. As such, a same data item may appear in each item selection list cluster multiple times because the same data item can appear in multiple different data item selection lists. Likewise, a same data item may appear in different data item selection list clusters.

In some implementations, each data item selection list cluster may be stored as a textual concatenation of all the item selection lists as part of the processed datasets 216 of FIG. 2. An example set of data item selection list clusters is show below in the QSR context in Table 2 with the top 15 words listed.

TABLE 2

Cluster: 0 texts count: 72
Cluster: 0 texts : ['poutine_fries', 'singl_chz', 'dbl_chz', 'spcy_chk', 'sm_coke', 'spcy_wrap', 'chk_strips', '10_pc_nugget', 'lg_fries', 'jr_chz_delx', 'sm_choc_frosty', 'dbl_jbc', 'jbc', 'md_coke', 'bcntr_dbl']
Cluster: 1 texts count: 58
Cluster: 1 texts : ['jr_choc_frosty', 'sm_fries', 'jr_strw_frosty', 'singl_chz', 'dbl_jbc', 'spcy_wrap', 'md_fries', 'sm_van_frosty', 'sm_coke', 'spcy_chk', 'jbc', 'lg_fries', 'md_choc_frosty', 'kd_fries', 'jr_chz_delx']

TABLE 2-continued

Cluster: 2 texts count: 79
Cluster: 2 texts : ['spcy_asiago', 'md_fries', 'md_coke', 'jbc', 'lg_fries', '5_pc_nugget', 'chili_chz_fry', 'sm_choc_frosty', 'bcn_poutine', 'md_sprite', 'sm_fries', '10_pc_nugget', 'jr_chz_delx', 'md_iced_tea','spcy_wrap']
Cluster: 3 texts count: 58
Cluster: 3 texts : ['sm_sprite', 'sm_fries', 'singl_chz', 'dbl_chz', 'spcy_chk', '5_pc_nugget', 'bcntr_dbl', 'lg_fries', 'md_fries', 'spcy_asiago', 'singl_bcn_dlx', 'son_bcntr', 'dbl_jbc', 'hmst', 'jbc']
Cluster: 4 texts count: 68
Cluster: 4 texts : ['lg_fries', 'md_coke', '10_pc_nugget', 'lg_chili', 'chk_strips', 'hmst', 'bcntr_dbl', 'dbl_chz', 'spcy_chk', 'singl_bcn_dlx', 'md_dt_coke', 'md_root_beer', 'jr_chz_delx', 'md_choc_frosty', '5_pc_nugget']
Cluster: 5 texts count: 110
Cluster: 5 texts : ['spcy_chk', 'md_fries', 'lg_fries', 'md_sprite', 'sm_fries', 'md_coke', 'md_lemonade', 'bcntr_dbl', 'sm_poutine', 'sm_chili', 'chk_strips', 'sm_iced_tea', 'md_fruitopia', '10_pc_nugget', 'tripl_chz']
Cluster: 6 texts count: 105
Cluster: 6 texts : ['sm_van_frosty', 'sm_choc_frosty', 'sm_fries', 'dbl_jbc', 'md_fries', 'jbc', 'lg_fries', '5_pc_nugget', 'singl_chz', 'grld_czr', 'spcy_chk', 'spcy_wrap', '10_pc_nugget', 'dbl_chz', 'lg_root_beer']
Cluster: 7 texts count: 24
Cluster: 7 texts : ['dbl_jbc', 'spcy_wrap', 'dbl_stack', 'sm_fries', 'md_coke', 'lg_chili', 'chzy_chedburg', 'md_fries', '5_pc_nugget', 'jbc', 'lg_orange', 'bacon_chz_pot', 'chili_chz_nacho', 'lg_choc_frosty', 'bottled_water']
Cluster: 8 texts count: 55
Cluster: 8 texts : ['son_bcntr', 'md_fries', 'md_strw_lemon', 'md_coke', 'lg_fries', 'md_sprite', 'jbc', 'spcy_wrap', 'spcy_chk', 'side_czr', 'singl_chz', 'dbl_chz', 'sm_coffee', 'md_iced_tea', 'lg_sprite']
Cluster: 9 texts count: 37
Cluster: 9 texts : ['md_van_frosty', 'md_choc_frosty', 'md_fries', 'lg_fries', 'spcy_chk', 'sm_fries', 'lg_dt_coke', 'sm_choc_frosty', 'chk_strips', '10_pc_nugget', 'dbl_chz', 'bcntr_dbl', 'lg_choc_frosty', 'grld_wrap', 'sm_fruitopia']
Cluster: 10 texts count: 149
Cluster: 10 texts : ['md_coke', 'bcntr_dbl', 'md_fries', 'spcy_chk', 'singl_chz', 'hmst', '5_pc_nugget', 'sm_choc_frosty', 'chk_strips', '10_pc_nugget', 'md_sprite', 'jbc', '2_grld_czr', 'hmst_asiago', 'grld_chk']
Cluster: 11 texts count: 93
Cluster: 11 texts : ['md_fries', 'md_iced_tea', 'chk_strips', 'md_fruitopia', 'spcy_chk', 'md_lemonade', '10_pc_nugget', 'singl_chz', 'dbl_chz', 'hmst_asiago', 'singl_bcn_dlx', 'bcntr_dbl', 'classic_asiago', 'hmst', 'grld_chk']
Cluster: 12 texts count: 78
Cluster: 12 texts : ['sm_dt_coke', 'sm_fries', 'spcy_chk', 'singl_chz', 'dbl_chz', 'chk_strips', 'md_fries', 'singl_bcn_dlx', 'grld_chk', '10_pc_nugget', '5_pc_nugget', 'spcy_asiago', 'lg_fries', 'bcntr_dbl', 'son_bcntr']
Cluster: 13 texts count: 62
Cluster: 13 texts : ['sm_strw_frosty', 'sm_choc_frosty', 'md_fries', '5_pc_nugget', 'chk_strips', 'sm_fries', 'jbc', 'dbl_jbc', 'singl_chz', 'spcy_chk', 'spcy_wrap', 'chili_chz_nacho', 'jr_choc_frosty', 'poutine_fries', 'sm_coke']
Cluster: 14 texts count: 118
Cluster: 14 texts : ['md_dt_coke', 'md_fries', 'spcy_chk', 'singl_chz', 'dbl_chz', 'chk_strips', 'bcntr_dbl', 'lg_fries', '5_pc_nugget', 'spcy_asiago', 'jr_chz_delx', 'jbc', 'sm_choc_frosty', 'side_czr', 'dbl_stack']
Cluster: 15 texts count: 46
Cluster: 15 texts : ['classic', 'md_fries', 'sm_fries', 'sm_sprite', 'lg_fries', 'sm_dt_coke', 'sm_root_beer', 'md_coke', 'bottled_water', 'md_sprite', 'sm_coke', 'singl_bcn_dlx', 'singl_chz', 'poutine_fries', 'dbl_chz']
Cluster: 16 texts count: 59
Cluster: 16 texts : ['lg_choc_frosty', 'lg_fries', 'dbl_chz', 'spcy_asiago', 'tripl_chz', 'md_fries', 'poutine_fries', '10_pc_nugget', 'sm_fries', 'md_coke', 'jr_chz_delx', 'chk_strips', 'jbc', 'bcntr_dbl', 'dbl_bcn_dlx']
Cluster: 17 texts count: 126
Cluster: 17 texts : ['jr_chz_delx', 'spcy_wrap', '5_pc_nugget', 'lg_fries', 'md_fries', 'sm_fries', '2_grld_czr', 'jbc', 'sm_choc_frosty', 'spcy_chk', '2_ap_pcn', 'sm_poutine', 'sm_coke', 'chili_chz_fry', 'dbl_chz']

TABLE 2-continued

Cluster: 18 texts count: 87
Cluster: 18 texts : ['lg_coke', 'lg_fries', 'bcntr_dbl', 'dbl_chz', 'singl_bcn_dlx', 'singl_chz', 'chk_strips', 'md_fries', '5_pc_nugget', 'spcy_chk', 'sm_choc_frosty', 'lg_fruitopia', '10_pc_nugget', 'hmst', 'lg_orange']
Cluster: 19 texts count: 89
Cluster: 19 texts : ['sm_fries', 'sm_orange', 'sm_lemonade', 'sm_fruitopia', 'spcy_chk', 'singl_chz', 'bcntr_dbl', 'dbl_chz', '10_pc_nugget', 'singl_bcn_dlx', 'classic_asiago', 'jbc', '5_pc_nugget', 'sm_strw_lemon', 'hmst']
Cluster: 20 texts count: 45
Cluster: 20 texts : ['son_bcntr', 'sm_fries', 'md_choc_frosty', 'sm_choc_frosty', 'sm_coke', '5_pc_nugget', 'sm_root_beer', 'sm_dt_coke', 'lg_van_frosty', 'md_nat_lemon', 'md_dt_coke', 'sm_poutine', 'sm_van_frosty', 'singl_bcn_dlx', 'sm_strw_lemon']
Cluster: 21 texts count: 149
Cluster: 21 texts : ['sm_coke', 'sm_fries', 'singl_chz', 'spcy_chk', 'dbl_chz', 'chk_strips', 'lg_fries', 'bcntr_dbl', 'singl_bcn_dlx', 'jbc', 'spcy_asiago', 'hmst', 'sm_choc_frosty', 'spcy_wrap', 'md_fries']
Cluster: 22 texts count: 127
Cluster: 22 texts : ['singl_chz', 'md_fries', 'md_lemonade', 'sm_fries', 'lg_fries', 'spcy_chk', 'md_iced_tea', 'md_sprite', 'jr_van_frosty', 'lg_nat_lemon', 'classic_asiago', 'lg_sprite', '5_pc_nugget', '10_pc_nugget', 'kd_fries']
Cluster: 23 texts count: 104
Cluster: 23 texts : ['5_pc_nugget', 'sm_fries', 'sm_choc_frosty', 'singl_chz', 'lg_fries', 'dbl_chz', 'grld_czr', 'hmst_asiago', 'summer_bry', 'spcy_chk', 'chili_chz_fry', 'md_fries', 'bottled_water', 'lg_iced_tea', 'md_dt_coke']
Cluster: 24 texts count: 112
Cluster: 24 texts : ['singl_bcn_dlx', 'md_fries', 'md_coke', 'md_dt_coke', 'lg_fries', 'sm_fries', '5_pc_nugget', 'sm_coke', 'md_sprite', 'sm_choc_frosty', 'singl_chz', 'spcy_wrap', 'md_lemonade', '10_pc_nugget', 'sm_coke_zero']
Cluster: 25 texts count: 124
Cluster: 25 texts : ['md_choc_frosty', 'md_fries', 'sm_choc_frosty', 'chk_strips', 'lg_fries', 'singl_chz', 'dbl_chz', 'spcy_chk', 'md_coke', '5_pc_nugget', '10_pc_nugget', 'jbc', 'bcntr_dbl', 'sm_fries', 'jr_hamb_deluxe']
Cluster: 26 texts count: 70
Cluster: 26 texts : ['md_orange', 'md_fries', 'bcntr_dbl', 'spcy_asiago', 'spcy_chk', 'son_bcntr', 'singl_chz', 'tripl_chz', 'lg_fries', 'dbl_chz', 'classic', '5_pc_nugget', 'chili_chz_fry', 'chk_strips', 'sm_choc_frosty']
Cluster: 27 texts count: 59
Cluster: 27 texts : ['grld_wrap', '5_pc_nugget', 'spcy_wrap', 'jbc', 'grld_chk', 'jr_chz_delx', '10_pc_nugget', 'md_fries', 'sm_choc_frosty', 'singl_chz', 'dbl_jbc', 'lg_chili', 'sm_fries', 'lg_fries', 'chili_chz_fry']
Cluster: 28 texts count: 45
Cluster: 28 texts : ['md_strw_frosty', 'md_choc_frosty', 'md_fries', 'lg_fries', 'sm_choc_frosty', 'jbc', 'son_bcntr', 'singl_chz', 'sm_strw_frosty', 'spcy_wrap', 'md_dt_coke', 'singl_bcn_dlx', 'bacon_chz_pot', 'md_root_beer', '5_pc_nugget']
Cluster: 29 texts count: 109
Cluster: 29 texts : ['dbl_jbc', '5_pc_nugget', 'sm_fries', 'lg_fries', 'md_coke', 'md_fries', 'chili_chz_fry', 'classic_asiago', 'sm_choc_frosty', 'jr_chz_delx', 'sm_poutine', 'dbl_chz', 'singl_chz', '10_pc_nugget', 'sm_coke']
Cluster: 30 texts count: 63
Cluster: 30 texts : ['lg_strw_lemon', 'lg_fries', 'bcntr_dbl', '10_pc_nugget', 'spcy_chk', 'tripl_chz', 'dbl_chz', 'spcy_asiago', 'spcy_wrap', '5_pc_nugget', 'singl_chz', 'classic', 'son_bcntr', 'jbc', 'md_fries']
Cluster: 31 texts count: 231
Cluster: 31 texts : ['lg_fries', 'sm_poutine', '10_pc_nugget', 'bcntr_dbl', 'chk_strips', 'classic_asiago', 'grld_chk', 'tripl_chz', 'bcn_poutine', 'lg_root_beer', 'hmst', 'lg_orange', 'lg_van_frosty', 'grld_czr', 'summer_bry']
Cluster: 32 texts count: 62
Cluster: 32 texts : ['chili_chz_nacho', 'jbc', 'bcntr_dbl', '5_pc_nugget', 'spcy_wrap', 'singl_chz', 'jr_chz_delx', 'singl_bcn_dlx', 'md_fries', 'dbl_jbc', 'dbl_chz', 'sm_strw_lemon', 'sm_choc_frosty', 'md_coke', 'sm_chili']
Cluster: 33 texts count: 81
Cluster: 33 texts : ['dbl_bcn_dlx', 'md_fries', 'lg_fries', 'sm_fries', 'md_coke', 'md_choc_frosty', 'jbc', 'md_sprite', 'sm_coke', 'dbl_jbc', 'singl_bcn_dlx', 'md_strw_lemon', 'sm_choc_frosty', 'chk_strips', 'md_root_beer']
Cluster: 34 texts count: 102
Cluster: 34 texts : ['md_root_beer', 'md_fries', 'spcy_chk', 'bcntr_dbl', 'dbl_chz', 'lg_fries', '5_pc_nugget', 'singl_chz', '10_pc_nugget', 'sm_fries', 'singl_bcn_dlx', 'chk_strips', 'dbl_stack', 'sm_choc_frosty', 'jbc']
Cluster: 35 texts count: 133
Cluster: 35 texts : ['jbc', '5_pc_nugget', 'sm_fries', 'sm_choc_frosty', 'spcy_chk', 'lg_fries', 'md_fries', 'singl_chz', 'kd_fries', 'chk_strips', '10_pc_nugget', 'sm_coke', 'sm_poutine', 'bcntr_dbl', 'jr_van_frosty']
Cluster: 36 texts count: 55
Cluster: 36 texts : ['lg_dt_coke', 'lg_fries', 'dbl_chz', '5_pc_nugget', 'spcy_asiago', 'chk_strips', 'bcntr_dbl', 'tripl_chz', 'dbl_stack', 'poutine_fries', 'singl_chz', '10_pc_nugget', 'spcy_chk', 'son_bcntr', 'md_fries']
Cluster: 37 texts count: 61
Cluster: 37 texts : ['srcrm_', '_chv_pot', 'jr_chz_delx', 'chili_chz_nacho', 'dbl_chz', 'singl_chz', 'lg_chili', 'spcy_chk', 'dbl_jbc', 'jbc', '5_pc_nugget', 'sm_strw_frosty', 'grld_chk', 'md_coke', 'side_salad']
Cluster: 38 texts count: 76
Cluster: 38 texts : ['sm_root_beer', 'sm_fries', 'spcy_chk', 'singl_chz', 'lg_fries', 'dbl_chz', 'spcy_asiago', 'jbc', 'chk_strips', 'sm_choc_frosty', 'dbl_stack', 'bcntr_dbl', 'sm_poutine', '10_pc_nugget', '5_pc_nugget']
Cluster: 39 texts count: 48
Cluster: 39 texts : ['sw_avcd', 'kd_fries', 'chili_chz_fry', 'poutine_fries', 'sm_van_frosty', 'taco_salad', 'sm_fries', 'spcy_wrap', 'bottled_water', 'singl_chz', 'chili_chz_nacho', 'md_strw_lemon', 'chk_strips', 'dbl_chz', '5_pc_nugget']
Cluster: 40 texts count: 68
Cluster: 40 texts : ['sm_coke_zero', '2_sw_avcd', 'sm_fries', 'jr_chz_delx', '5_pc_nugget', 'spcy_chk', 'jbc', 'sm_chili', 'sm_choc_frosty', 'spcy_asiago', 'bacon_chz_pot', 'singl_bcn_dlx', 'md_coke', 'side_salad', 'md_sprite']
Cluster: 41 texts count: 140
Cluster: 41 texts : ['spcy_wrap', 'jbc', '5_pc_nugget', 'summer_bry', 'sm_fries', 'sm_chili', 'sm_nat_lemon', 'md_fries', 'md_coke', 'chili_chz_fry', 'spcy_chk', 'lg_fries', '10_pc_nugget', 'singl_chz', 'dbl_chz']
Cluster: 42 texts count: 133
Cluster: 42 texts : ['dbl_chz', 'md_coke', 'md_fries', 'lg_fries', 'spcy_chk', 'singl_chz', '10_pc_nugget', 'md_sprite', 'sm_chili', '5_pc_nugget', 'sm_choc_frosty', 'sm_fries', 'lg_root_beer', 'md_lemonade', 'sm_orange']
Cluster: 43 texts count: 79
Cluster: 43 texts : ['dbl_stack', 'spcy_chk', 'jr_chz_delx', 'spcy_wrap', 'sm_fries', '5_pc_nugget', 'sm_poutine', 'dbl_jbc', 'lg_iced_tea', 'jr_hamb_deluxe', 'md_fries', 'lg_fries', 'singl_bcn_dlx', 'sm_choc_frosty', 'md_fruitopia']
Cluster: 44 texts count: 88
Cluster: 44 texts : ['sm_strw_lemon', 'sm_fries', 'spcy_chk', 'singl_chz', 'md_fries', 'bcntr_dbl', 'son_bcntr', 'spcy_wrap', '5_pc_nugget', 'singl_bcn_dlx', '10_pc_nugget', 'dbl_chz', 'dbl_jbc', 'side_czr', 'spcy_asiago']
Cluster: 45 texts count: 169
Cluster: 45 texts : ['sm_choc_frosty', 'sm_fries', 'singl_chz', 'md_fries', 'chk_strips', 'lg_fries', 'spcy_chk', 'jr_van_frosty', 'sm_chili', 'hmst_asiago', 'classic_asiago', '10_pc_nugget', 'md_coke', 'chili_chz_fry', 'son_bcntr']
Cluster: 46 texts count: 42
Cluster: 46 texts : ['md_coke_zero', 'md_fries', 'spcy_chk', 'dbl_chz', 'bcntr_dbl', 'singl_chz', '10_pc_nugget', 'dbl_stack', 'chili_chz_nacho', 'lg_fries', 'sm_fries', 'sm_chili', 'sm_choc_frosty', 'poutine_fries', 'md_strw_lemon']
Cluster: 47 texts count: 34
Cluster: 47 texts : ['grld_asiago', 'md_fries', 'sm_fries', 'md_root_beer', 'lg_coke', 'md_coke', '5_pc_nugget', 'md_choc_frosty', 'sm_coke', 'lg_root_beer', 'side_czr', 'md_strw_lemon', 'jr_chz_delx', 'md_dt_coke', 'lg_iced_tea']
Cluster: 48 texts count: 116
Cluster: 48 texts : ['md_strw_lemon', 'md_fries', 'spcy_chk', 'spcy_asiago', 'dbl_chz', 'chk_strips', '10_pc_nugget', '5_pc_nugget', 'singl_chz', 'bcntr_dbl', 'singl_bcn_dlx', 'sm_fries', 'lg_fries', 'md_choc_frosty', 'sm_choc_frosty']
Cluster: 49 texts count: 59
Cluster: 49 texts : ['chzy_chedburg', '5_pc_nugget', 'jbc', 'md_fries', 'lg_fries', 'spcy_chk', 'jr_chz_delx', 'sm_fries', 'sm_poutine', 'dbl_jbc', 'md_root_beer', 'sm_van_frosty', 'spcy_wrap', 'spcy_asiago', 'sm_choc_frosty']

TABLE 2-continued

Cluster: 50 texts count: 74
Cluster: 50 texts : ['sm_iced_tea', 'sm_fries', 'chk_strips', 'spcy_chk',
'md_fries', '5_pc_nugget', 'singl_chz', 'singl_bcn_dlx',
'spcy_asiago', 'dbl_chz', 'bcntr_dbl', 'spcy_wrap', '10_pc_nugget',
'hmst_asiago', 'hmst']
Cluster: 51 texts count: 69
Cluster: 51 texts : ['jr_strw_frosty', 'kd_fries', 'kd_toy',
'kd_4_pc_nugget', 'jr_choc_frosty', 'kd_jr_chz', 'under_3_toy',
'kd_dt_coke', 'choc_milk', 'kd_sprite', 'apl_juice', 'bottled_water',
'kd_jr_hamb', 'sm_poutine', 'sm_fries']
Cluster: 52 texts count: 26
Cluster: 52 texts : ['lg_coke_zero', 'lg_fries', 'spcy_chk',
'5_pc_nugget', 'dbl_chz', 'son_bcntr', 'dbl_jbc', 'md_fries',
'side_czr', 'bcntr_dbl', '10_pc_nugget', 'lg_nat_lemon', 'singl_chz',
'taco_salad', 'jr_chz_delx']
Cluster: 53 texts count: 43
Cluster: 53 texts : ['ap_pcn', 'spcy_wrap', 'md_fries', 'jbc',
'md_root_beer', '5_pc_nugget', 'md_coke', '2_ap_pcn', 'hmst',
'chili_chz_fry', 'sm_strw_lemon', 'singl_chz', 'lg_coke',
'chk_strips', 'sm_fries']
Cluster: 54 texts count: 48
Cluster: 54 texts : ['bottled_water', 'sm_fries', 'dbl_chz', 'spcy_chk',
'5_pc_nugget', 'chk_strips', 'md_fries', 'bcntr_dbl', 'grld_chk',
'lg_fries', 'singl_chz', 'jr_chz_delx', 'jbc', 'spcy_asiago',
'sm_nat_lemon']

The numbers of times of the data items appear in each data item selection list cluster may be extracted. The data item with the largest number of appearances, for example, may be identified as the dominant data item in that data item selection list cluster. The frequency of data item appearances, particular that for the most dominant data item in a data item selection list cluster may be further used in the personalized menu, personalized data item recommendation, and context-based search, as described in further detail below.

In some example implementations, the recommendation engine 224 of FIG. 2 may be configured to generate a ranking of at least one data item from the data item pool for each particular entity such that the highly ranked data items may be recommended to the particular entity. Such data item ranking, for example, may be generated based on a personalized score for each of the data item and with respect to a particular entity.

In a particular example implementation, a personalized ranking score for a particular data item with respect to a particular entity may be generated as a sum of a plurality of sub-ranking scores:

$$S_i = \sum_{j=1}^{M} S_i^j$$

where $S_i$ represents the ranking score for data item i personalized for the particular entity, and $S_i^j$ represents the sub-ranking scores.

In some example implementations, the sub-ranking scores may be summed over a set of data item selection list clusters which contain the data item i. As such, the sum above may be accumulated over M data item selection list clusters that contain the data item i. As such, each sub-ranking score $S_i^j$ may be obtained for data item selection list cluster j above that contains the particular data item, and may be referred to as cluster-wise-sub-ranking score for data item i personalized with respect to the particular entity.

In some particular implementations, the cluster-wise-sub-ranking score for the particular data item personalized for the particular entity with respect to cluster j may be constructed as a product of at least three parts:

$$S_i^j \propto S_i^{j,1} S_i^{j,2} S_i^{j,3}$$

The first part, $S_i^{j,1}$, for example, may include an entity cluster count of the particular entity with respect to the data item selection list cluster j. The entity cluster count may be obtained by extracting a number of data item selection lists (orders) of the particular entity appearing in the data item selection list cluster j (note that each data item selection list cluster is a concatenation of all data selection lists belonging to this data item selection list cluster).

The second part, $S_i^{j,2}$, for example, may include a cluster word count of the text form of the particular data item i appearing in the concatenated textual version of the data item selection list cluster j.

The third part, $S_i^{j,3}$, for example, may include an entity data item count for the particular data item i with respect to the particular entity. Specifically, $S_i^{j,3}$ may be determined by extracting the number of times that the particular entity has historically ordered or selected this particular data item i.

A specific example is provided below that follow the example implementation above for determining the ranking score $S_i$ of the particular data item i with respect to the particular entity.

Specifically, a simplified collection of data item selection lists (orders) for the particular entity may be:

TABLE 3

| Row Numer | ORDER_ID | QUANTITY_NUM | PRODUCT_ALOHA_NAM |
|---|---|---|---|
| 1 | 222643522 | 1 | 5 pc Nugget |
| 2 | 222643522 | 1 | SM Fries |
| 3 | 226019054 | 1 | Dbl JBC |
| 4 | 229144486 | 1 | JR Chz Delx |
| 5 | 229558401 | 1 | Dbl JBC |
| 6 | 229707331 | 1 | SM Root Beer |
| 7 | 229707331 | 1 | Spcy Asiago |
| 8 | 233173800 | 1 | SM Van Frosty |
| 9 | 227748510 | 1 | Singl Chz |
| 10 | 198302496 | 1 | MD Choc Frosty |
| 11 | 226019054 | 1 | SM Fries |
| 12 | 225904322 | 1 | JBC |
| 13 | 233173800 | 1 | Singl Chz |
| 14 | 208802343 | 1 | MD Fries |
| 15 | 222112309 | 1 | Singl Chz |
| 16 | 225904322 | 1 | Singl Chz |
| 17 | 227312391 | 1 | SM Fries |
| 18 | 229144486 | 1 | Spcy Wrap |
| 19 | 229144486 | 1 | ½ SW Avcd |

TABLE 3-continued

| Row Numer | ORDER_ID | QUANTITY_NUM | PRODUCT_ALOHA_NAM |
|---|---|---|---|
| 20 | 198302496 | 1 | Dbl Chz |
| 21 | 198302496 | 1 | MD Fries |
| 22 | 222112309 | 1 | JBC |
| 23 | 226819712 | 1 | Spcy Asiago |
| 24 | 226819712 | 1 | SM Coke |
| 25 | 227312391 | 1 | Dbl JBC |
| 26 | 227748510 | 1 | Singl Chz |
| 27 | 229558401 | 1 | Spcy Wrap |
| 28 | 229707331 | 1 | Spcy Asiago |
| 29 | 229707331 | 1 | SM Fries |
| 30 | 233173800 | 1 | LG Fries |
| 31 | 219066156 | 1 | LG Fries |
| 32 | 222643522 | 1 | Dbl JBC |
| 33 | 222643522 | 1 | 5 pc Nugget |
| 34 | 227748510 | 1 | Spcy Chk |
| 35 | 227748510 | 1 | Spcy Chk |
| 36 | 229558401 | 1 | 5 pc Nugget |
| 37 | 229707331 | 1 | SM Root Beer |
| 38 | 198302496 | 1 | 5 pc Nugget |
| 39 | 208802343 | 1 | Singl Chz |
| 40 | 219066156 | 1 | JBC |
| 41 | 222643522 | 1 | SM Fries |
| 42 | 222643522 | 1 | Dbl JBC |
| 43 | 226019054 | 1 | 5 pc Nugget |
| 44 | 226819712 | 1 | SM Fries |
| 45 | 227312391 | 1 | 5 pc Nugget |
| 46 | 229558401 | 1 | SM Fries |
| 47 | 229707331 | 1 | SM Fries |
| 48 | 233173800 | 1 | Dbl JBC |

Each row of the collection above represents a data item that was historically ordered or selected by the particular entity. The order ID is shown in the left column whereas the corresponding selected data item is shown in the right column. In the example above, the particular entity has made 48 selections of various data items historically. The rows having a same order ID represent items selected in a same ordering or data item selection event. For example, the data items in row numbers 1, 2, 32. 33. 41, and 42 belong to the same order (order ID 222643522). The example data item collection above thus represents 14 different orders (14 unique order IDs).

The data selection list clusters associated with these 14 orders or data item selection lists may be identified. For example, these orders may be part of data selection list cluster numbers 35, 29, 22, 25, 21, 40, 7, 38, and 6 above in Table 2. Each of these cluster includes one or more of the 14 orders or data item selection lists of the particular entity. Such distribution of the orders of the particular entity among these data item selection list clusters may be extracted as a collection of data pairs:

Entity: [(35, 3), (29, 3), (22, 2), (25, 1), (21, 1), (40, 1), (7, 1), (38, 1), (6, 1)], where each pair is associated with one data item selection list cluster, the first numbers in the pairs represent the data item selection list cluster identifiers, and the second numbers in the pairs represent the numbers of orders or data item selection lists of the particular entity in the corresponding data item selection list clusters. The second numbers in the pairs particular provide entity cluster count above.

Ranking score for a particular entity i with respect to the particular entity above may be obtained by summing the cluster-wise-sub-ranking scores over data item selection list cluster numbers 35, 29, 22, 25, 21, 40, 7, 38, and 6. For example, data item word counts in the concatenated textual version of these clusters may be extracted in descending order of word count as:

TABLE 4

Cluster 35:
[('jbc', 250), ('fries', 96), ('5_pc_nugget', 73), ('choc_frosty', 29), ('spcy_chk', 22), ('coke', 14), ('root_beer', 14), ('singl_chz', 13), ('dbl_chz', 8), ('orange', 8), ('chk_strips', 7), ('sprite', 6), ('kd_fries', 6), ('strw_lemon', 5), ('10_pc_nugget', 5), ('jr_van_frosty', 4), ('bacon_chz_pot', 3), ('iced_tea', 3), ('bcntr_dbl', 3), ('spcy_wrap', 2)]
Cluster 29:
[('dbl_jbc', 194), ('fries', 53), ('5_pc_nugget', 36), ('choc_frosty', 17), ('chili_chz_fry', 15), ('coke', 12), ('sprite', 8), ('jbc', 7), ('spcy_chk', 6), ('dbl_chz', 6), ('van_frosty', 6), ('bacon_chz_pot', 6), ('summer_bry', 5), ('orange', 5), ('10_pc_nugget', 4), ('jr_chz_delx', 3), ('singl_chz', 3), ('poutine', 3), ('classic_asiago', 3), ('jr_van_frosty', 3)]
Cluster 22:
[('singl_chz', 286), ('fries', 103), ('spcy_chk', 12), ('root_beer', 10), ('fruitopia', 10), ('lemonade', 9), ('chili', 8), ('coke', 8), ('5_pc_nugget', 7), ('iced_tea', 6), ('bcn_poutine', 6), ('dt_coke', 5), ('sprite', 5), ('kd_fries', 5), ('10_pc_nugget', 5), ('orange', 5), ('poutine_fries', 5), ('choc_frosty', 4), ('classic_asiago', 4), ('summer_bry', 4)]
Cluster 25:
[('choc_frosty', 166), ('fries', 62), ('singl_chz', 18), ('coke', 13), ('spcy_chk', 13), ('10_pc_nugget', 12), ('dbl_chz', 11), ('chk_strips', 10), ('bcntr_dbl', 9), ('5_pc_nugget', 8), ('jbc', 5), ('orange', 4), ('side_czr', 3), ('grld_czr', 3), ('classic_asiago', 3), ('bacon_chz_pot', 2), ('jr_chz_delx', 2), ('spcy_wrap', 2), ('jr_hamb_deluxe', 2), ('hmst', 2)]
Cluster 21:
[('coke', 224), ('fries', 202), ('spcy_chk', 53), ('singl_chz', 51), ('dbl_chz', 38), ('bcntr_dbl', 19), ('singl_bcn_dlx', 15), ('chk_strips', 14), ('spcy_asiago', 13), ('choc_frosty', 12), ('spcy_wrap', 10), ('5_pc_nugget', 10), ('hmst', 9), ('poutine', 9), ('jbc', 7), ('10_pc_nugget', 5), ('tripl_chz', 5), ('bcn_poutine', 5), ('side_czr', 4), ('fruitopia', 4)]
Cluster 40:
[('coke_zero', 89), ('fries', 72), ('½_sw_avcd', 71), ('5_pc_nugget', 46), ('jbc', 33), ('jr_chz_delx', 31), ('grld_chk', 25), ('spcy_chk', 17), ('chili', 15), ('dbl_bcn_dlx', 13), ('choc_frosty', 12), ('singl_bcn_dlx', 12), ('kd_fries', 12), ('dbl_chz', 10), ('strw_frosty', 8), ('coke', 7), ('spcy_asiago', 6), ('bacon_chz_pot', 6), ('srcrm_&_chv_pot', 6), ('side_czr', 6)]

TABLE 4-continued

Cluster 7
[('spcy_wrap', 35), ('dbl_jbc', 35), ('fries', 9), ('choc_frosty', 6), ('5_pc_nugget', 6), ('coke', 4), ('chili', 4), ('dbl_stack', 4), ('jbc', 2), ('poutine_fries', 2), ('chzy_chedburg', 2), ('bacon_chz_pot', 1), ('grld_wrap', 1), ('hmst', 1), ('bottled_water', 1), ('coke_zero', 1), ('chili_chz_nacho', 1), ('son_bcntr', 1), ('orange', 1), ('strw_lemon', 1)]
Cluster 38:
[('fries', 162), ('root_beer', 148), ('singl_chz', 52), ('spcy_chk', 47), ('dbl_chz', 18), ('spcy_asiago', 17), ('dbl_stack', 17), ('jbc', 13), ('chk_strips', 13), ('dt_coke', 9), ('coke', 9), ('choc_frosty', 8), ('taco_salad', 7), ('10_pc_nugget', 6), ('ap_pcn', 6), ('bcntr_dbl', 5), ('poutine', 3), ('5_pc_nugget', 3), ('jr_chz_delx', 2), ('grld_wrap', 2)]
Cluster 6:
[('van_frosty', 118), ('fries', 29), ('choc_frosty', 24), ('jbc', 13), ('dbl_jbc', 10), ('spcy_chk', 9), ('5_pc_nugget', 7), ('singl_chz', 5), ('spcy_wrap', 3), ('dbl_chz', 2), ('10_pc_nugget', 2), ('grld_czr', 2), ('coke', 1), ('bacon_chz_pot', 1), ('bcntr_dbl', 1), ('root_beer', 1), ('singl_bcn_dlx', 1), ('jr_chz_delx', 1), ('kd_fries', 1), ('chk_strips', 1)]

The data extraction above provides the cluster word count $S_i^{j,2}$ for each of the data items in each of the data item selection list clusters for the particular entity (or customer) above.

In addition, the entity item counts for various data items with respect to the particular entity may be further extracted based on the order data 206 or based on the processed data 216 of FIG. 2. For example, the various data items historically ordered or selected by the particular entity above may be extracted as:

TABLE 5

[('fries', 12), ('5_pc_nugget', 6), ('singl_chz', 6), ('dbl_jbc', 6), ('jbc', 3), ('spcy_asiago', 3), ('spcy_chk', 2), ('spcy_wrap', 2), ('root_beer', 2), ('choc_frosty', 1), ('dbl_chz', 1), ('coke', 1), ('jr_chz_delx', 1), ('½_sw_avcd', 1), ('van_frosty', 1)]

Given the example data above, each of the cluster-wise-sub-ranking score $S_i^j$ for each of the data items for the particular entity may be derived. Then the ranking score for each data item as personalized for the particular entity may be calculated as the sum of the cluster-wise-sub-ranking scores. For example, for data item "fries", the personalized ranking score may be calculated as 14268 via the process shown in Table 6 below:

TABLE 6

|  | $S_{fries}^{j,3}$ | $S_{fries}^{j,2}$ | $S_{fries}^{j,3}$ | $S_{fries}^{j}$ |
|---|---|---|---|---|
| Cluster 35 | 3 | 96 | 12 | 3456 |
| Cluster 29 | 3 | 53 | 12 | 1908 |
| Cluster 22 | 2 | 103 | 12 | 2472 |
| Cluster 25 | 1 | 62 | 12 | 744 |
| Cluster 21 | 1 | 202 | 12 | 1224 |
| Cluster 40 | 1 | 72 | 12 | 864 |
| Cluster 7 | 1 | 9 | 12 | 108 |
| Cluster 38 | 1 | 162 | 12 | 1944 |
| Cluster 6 | 1 | 29 | 12 | 348 |
| Sum |  |  |  | 14268 |

Likewise, personalized ranking score for other data items may be similarly derived as shown below in Table 7 in descending order:

TABLE 7

[['fries', 14268], ['singl_chz', 4476], ['dbl_jbc', 3762], ['jbc', 2532], ['5_pc_nugget', 2526], ['spcy_chk', 494], ['root_beer', 422], ['choc_frosty', 374], ['coke', 352], ['van_frosty', 136], TABLE 7-continued

['dbl_chz', 121], ['spcy_wrap', 112], ['spcy_asiago', 108], ['coke_zero', 90], ['½_sw_avcd', 71], ['10_pc_nugget', 62], ['chk_strips', 59], ['orange', 54], ['sprite', 52], ['chili_chz_fry', 45], ['jr_chz_delx', 45], ['bcntr_dbl', 43], ['kd_fries', 41], ['bacon_chz_pot', 37], ['chili', 35], ['singl_bcn_dlx', 28], ['grld_chk', 25], ['fruitopia', 24], ['summer_bry', 23], ['jr_van_frosty', 21], ['iced_tea', 21], ['poutine', 21], ['dbl_stack', 21], ['classic_asiago', 20], ['dt_coke', 19], ['lemonade', 18], ['bcn_poutine', 17], ['strw_lemon', 16], ['side_czr', 13], ['dbl_bcn_dlx', 13], ['poutine_fries', 12], ['hmst', 12], ['strw_frosty', 8], ['taco_salad', 7], ['srcrm_&_chv_pot', 6], ['ap_pcn', 6], ['grld_czr', 5], ['tripl_chz', 5], ['grld_wrap', 3], ['jr_hamb_deluxe', 2], ['chzy_chedburg', 2], ['bottled_water', 1], ['chili_chz_nacho', 1], ['son_bcntr', 1]]

These item-specific ranking scores for the particular entity may be used as at least one of the factors for the personalized recommendation of data items for the particular entity.

In some further example implementations, a recommendation feedback may be generated and recorded by the back-end 204 of FIG. 2. For example, after a particular data item is recommended to the particular entity, the back-end 204 may monitor whether the recommended data item is actually selected as a result of the recommendation. A positive feedback value may be attributed to the data item with respect to the particular entity when the data item is actually selected as a result of the recommendation. An overall feedback score associated with the data item may be incremented by an amount equal to or derived from the positive feedback value. The overall recommendation feedback score may thus be accumulative. The recommendation feedback score is thus data-item-specific, and also entity-specific.

In some example implementations, the personalized ranking score of the data item with respect to the particular entity as described above may additionally take into consideration the accumulative recommendation feedback score associated with the data item. For example, the personalized ranking score calculated above from the cluster-wise-sub-ranking scores may be additionally scaled or weighed (by multiplication) by the accumulated recommendation feedback score.

In some example implementations, the scaling and weighting of the personalized ranking score for a data item with the feedback considered may be generated periodically, e.g., every week. For example, the ranking score for several top ranked data items with respect to a particular customer at a starting date may be [['fries', 14268], ['singl_chz', 4476], ['dbl_jbc', 3762], ['jbc', 2532], ['5_pc_nugget', 2526], ['spcy_chk', 494], ['root_beer', 422], ['choc_frosty', 374], ['coke', 352], ['van_frosty', 136], ['dbl_chz', 121], ['spcy_wrap', 112], ['spcy_asiago', 108], ['coke_zero', 90], ['½_sw_avcd', 71], ['10_pc_nugget', 62]]. Personalized recommendation of these items may be made to the customer. Assume that the customer selected "fries", 5 pc nugget", and "coke" each twice as a result of the recommendation in the next couple of days. Then recommendation matching data in a form of, for example "fries [2], 5 pc nugget [2], coke [2]" may be stored in the system. Then for the recommendation during a next period (e.g., next week), the ranking scores for the top-ranked item for this customer may be updated by scaling the ranking score of "fries", "5 pc nugget", and "coke" by a weight factor of, e.g., 5 for each recommendation match: [['fries', 142680], ['5_pc_nugget', 25260], ['singl_chz', 4476], ['dbl_jbc', 3762], ['coke', 3520], ['jbc', 2532], ['spcy_chk', 494], ['root_beer', 422], ['choc_frosty', 374], ['van_frosty', 136], ['dbl_chz', 121],

['spcy_wrap', 112], ['spcy_asiago', 108], ['coke_zero', 90], ['½_sw_avcd', 71], ['10_pc_nugget', 62]]. In other words, the three matched data items are each scaled by a factor 10 (predetermined weight factor of 5 and two matches for each data item). The scaled ranking scores are reordered as indicated above.

The example implementations above for personalized data item ranking and recommendation is based on a particular entity that has historically selected data items from the data item pool as tracked by the back-end 204 of FIG. 2. For a new entity that has not had a history with the data processing system above, data item recommendation may be performed based on a user input and recognized data item correction from historical data item selection by other entities.

In some implementations, for example, the entity may input a data item or words in the interactive user interface 208 of FIG. 2, the entered data items may be used as a seed to identify other data items for recommendation to the user based on historical data item selection by other entities. For example, data items similar to the input data item or words may be identified for recommendation. The similarity between items may be determined using an example TFIDF (Term Frequency/Inverse Document Frequency) algorithm. Input to the TFIDF algorithm may be the various data item selection lists by other entities. TFIDF scores may be obtained for various other data items. A cutoff or threshold TFIDF score may be predetermined for selecting a set of data items for recommendation based on the input data item or words and historical data item selection by other entities.

In a specific example, a TFIDF vector of the historical selection data may be built first. Then, for a new entity that is not associated with any historical data yet, when the new entity selects, for example, "sm_fries" and "dbl_jbc" in the interactive user interface, TFIDF prediction with these entered items may be performed with various cosine scores. For example:
    cosinescore=1.0000000000000002 statement=sm_fries; dbl_jbc row number=0
    cosinescore=1.0000000000000002 statement=dbl_jbc; 5_pc_nugget;sm_fries row number=441
    cosinescore=1.0000000000000002 statement=sm_fries; dbl_jbc;5_pc_nugget row number=793
    cosinescore=1.0000000000000002 statement=sm_fries; 5_pc_nugget;dbl_jbc row number=1230
    cosinescore=1.0000000000000002 statement=sm_fries; dbl_jbc row number=
    cosinescore=1.0000000000000002 statement=dbl_jbc; sm_fries row number=1745
    cosinescore=1.0000000000000002 statement=5_pc_nugget;sm_fries;dbl_jbc;5_pc_nugget;sm_fries;dbl_jbc row number=1781
    cosinescore=1.0000000000000002 statement=dbl_jbc; sm_fries;5_pc_nugget row number=3286
    cosinescore=1.0 statement=dbl_jbc;sm_fries;5_pc_nugget;dbl_jbc;5_pc_nugget;sm_fries;sm_fries;5_pc_nugget;dbl_jbc row number=1042
    cosinescore=1.0 statement=sm_fries;dbl_jbc;dbl_jbc; sm_fries;5_pc_nugget;5_pc_nugget;dbl_jbc; 5_pc_nugget;sm_fries row number=1575
    cosinescore=0.8633420182392476 statement=lg_fries; sm_fries;dbl_jbc row number=467
    cosinescore=0.8503060232079782 statement=dbl_jbc; dbl_jbc row number=714
    cosinescore=0.8503060232079782 statement=5_pc_nugget;dbl_jbc row number=1021
    cosinescore=0.8503060232079782 statement=dbl_jbc; spcy_asiago row number=1419
    cosinescore=0.8503060232079782 statement=dbl_jbc; dbl_jbc;5_pc_nugget;5_pc_nugget row number=1500
    cosinescore=0.8503060232079782 statement=dbl_jbc; dbl_jbc;dbl_jbc row number=1652
    cosinescore=0.8503060232079782 statement=dbl_jbc; sm_sprite row number=1905
    cosinescore=0.8503060232079782 statement=dbl_jbc; dbl_jbc;dbl_jbc;dbl_jbc;dbl_jbc;dbl_jbc;dbl_jbc; dbl_jbc row number=2037
    cosinescore=0.8503060232079782 statement=dbl_jbc row number=2428
    cosinescore=0.8503060232079782 statement=dbl_jbc; 5_pc_nugget row number=2457

A predefined cut off cosine score may be used for recommendation. For example, the cut-off cosine score may be 0.8, and the recommendation in the example above may be "sm_sprite", and "5 pc nugget".

Returning to FIG. 2, and in some example implementations, the back-end 202 may be configured to provide a multi-level personalization to a particular entity via the interactive user interface 208. The multi-level personalization may be provided based on the various components described above, including but not limited to personalized or overall data item selection statistics, personalized data item ranking, entity segmentation, data item clustering, and data item selection list clustering.

For example, a high-level personalized menu may be provided. The personalized menu, for example, may list selected data items in the normal categories (e.g., main food item, drink, dissert categories). The selection of the items for each normal category may be based on overall data item popularity described above. The selection may be alternatively or additionally based on the data item popularity calculated for the particular entity (based on his/her historical orders). Alternatively, or additionally, the selection of the data items into the normal categories may be based on the personalized ranking of the data items described above for each normal category. Alternatively, or additionally, the selection of the data items into the personalized menu may be based on the data item clustering above in conjunction of personal data item popularity. For example, the most popular item for the particular entity may be used to seed into data item clusters described above and the personalized menu may include data items within the identified data item clusters.

In some example implementations, alternative to or in additional to the personalized menu above, personalized recommendation of a combination of data items may be provided via the interactive user interface 208. The data items included in the recommendation may be generated based on the personalized data item ranking score described above for entities having a data item selection history.

In some example implementations, the interactive user interface 208 may provide a capability for an entity to input search inquiries. Such search inquiries may be processed by the context-based search engine 222 of FIG. 2. Based on the various analytics of historical data item selection data, the context-based search engine 222 may use various data points to provide a faster, more accurate, and personalized and context-based searches, including but not limited to: entity data item selection list cluster fit data, data item cluster fit data, and context (e.g., context-location-weather-time) data. For example, when user logins, the system will identify the dominant item cluster and data item selection list clusters he/she belongs to. For example, the user may belong to data item list cluster 35, 29, 22 and minor 25, 41, 7, 38, 6. The search will then be restrained within this data set resulting in faster personalized search for the user. If user types "Lunch", for example, lunch items would be populated within these clusters for this user. If user types fries/coke, then the most dominant item cluster may be identified and provided as the search result with a search score.

The disclosure above is thus directed generally to an automatic intelligent electronic data processing system, platform, and method for computerized multi-facet data pattern recognition and ranking, and particularly to intelligently and personalize recommend data items for consumption by a particular entity based on past data consumption history of the entity and/or other entities via machine recognition of intra and/or inter-entity data item selection correlations. Such personalized recommendation may be based on a multi-facet ranking of the data items by integrating various intra-entity and inter-entity correlations and patterns in data item consumption into a quantifiable entity-specific ranking score for each data item that may potentially be selected for consumption by a particular entity. The disclosure above describes an interactive online user interface provided to a target entity to place an order by selecting a set of data items from the pool of data items available for selection. Rather than providing and displaying the entire pool of data items, either as a whole or as hierarchical interactive menus, only a subset of the data items may be displayed for the target entity for inspection and selection, thereby avoiding crowdedness and confusion on the user interface. Such subset of data items may be presented as a reduced menu. Further, a number of data items may be recommended (referred to as a recommendation or a recommendation list). As described in the various implementations below, such menu reduction and/or data item recommendation may be intelligently and predictively determined in a personalized and adaptive manner for the target entity. The personalization and adaptation may be based on information pertaining to the target entity and/or correlation between the data items as established and automatically recognized from historical orders by a plurality of entities.

Figure 6:
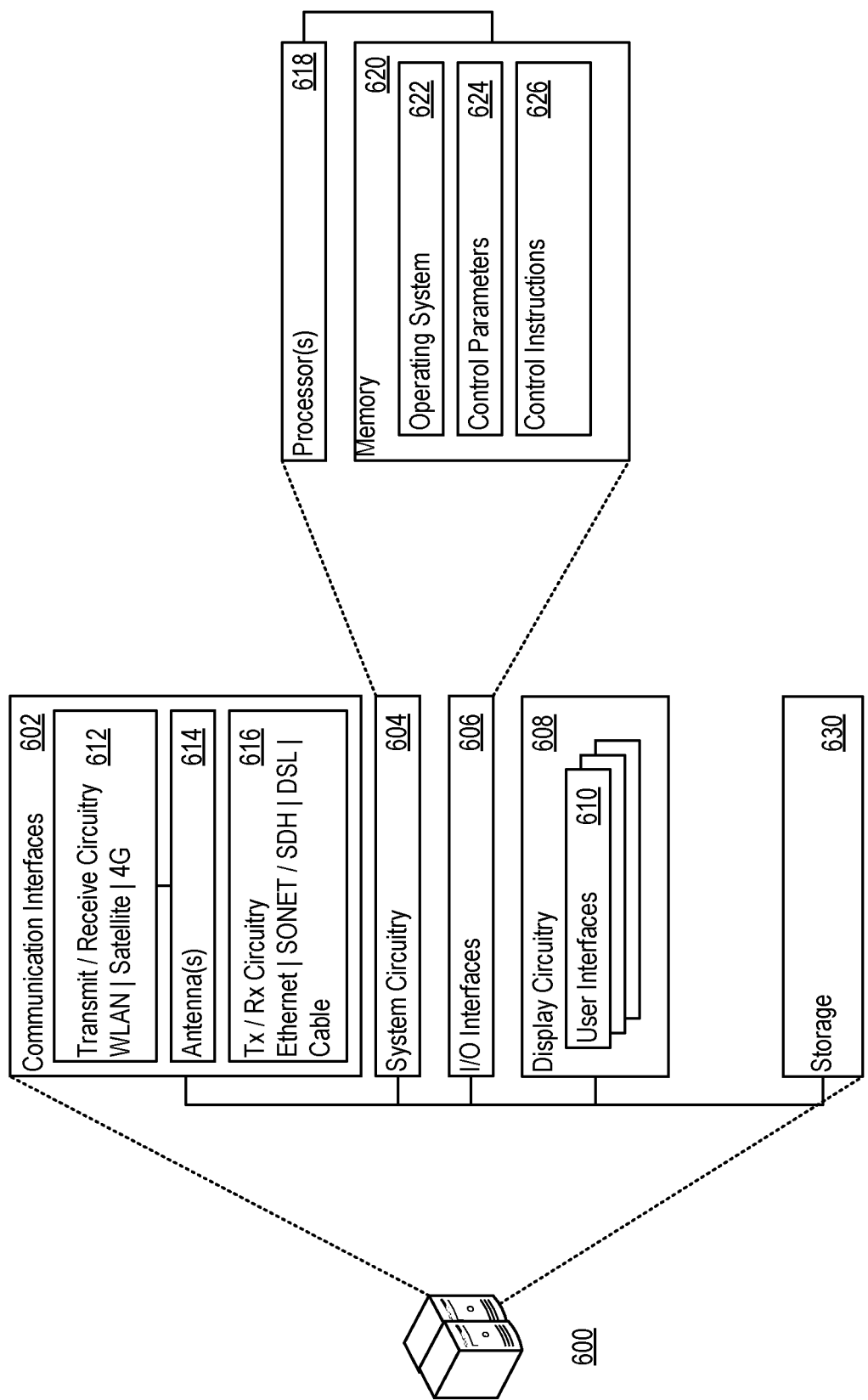
FIG. 6 illustrates an example computing device that may be used to implement various computing components of the example systems above.

Finally, FIG. 6 illustrates an exemplary architecture of a computing device 600 on which the various computing components of the system described above. The computing device 600 may include communication interfaces 602, system circuitry 604, input/output (I/O) interface circuitry 606, and display circuitry 608. The graphical user interfaces (GUIs) 610 displayed by the display circuitry 608 may be used to receive user commands/input and to display various outputs. The GUIs 610 may be displayed locally using the display circuitry 608, or for remote visualization, e.g., as HTML, JavaScript, audio, and video output for a web browser running on a local or remote machine.

The GUIs 610 and the I/O interface circuitry 606 may include touch sensitive displays, voice or facial recognition inputs, buttons, switches, speakers and other user interface elements. Additional examples of the I/O interface circuitry 606 includes microphones, video and still image cameras, headset and microphone input/output jacks, Universal Serial Bus (USB) connectors, memory card slots, and other types of inputs. The I/O interface circuitry 606 may further include magnetic or optical media interfaces (e.g., a CDROM or DVD drive), serial and parallel bus interfaces, and keyboard and mouse interfaces.

The communication interfaces 602 may include wireless transmitters and receivers ("transceivers") 612 and any antennas 614 used by the transmit and receive circuitry of the transceivers 612. The transceivers 612 and antennas 614 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 602 may also include serial interfaces, such as universal serial bus (USB), serial ATA, IEEE 1394, lighting port, $I^2C$, slimBus, or other serial interfaces. The communication interfaces 602 may also include wireline transceivers 616 to support wired communication protocols. The wireline transceivers 616 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 604 may include any combination of hardware, software, firmware, APIs, and/or other circuitry. The system circuitry 604 may be implemented, for example, with one or more systems on a chip (SoC), application specific integrated circuits (ASIC), microprocessors, discrete analog and digital circuits, and other circuitry. The system circuitry 604 may implement any desired functionality of the disclosed system and its various components. As just one example, the system circuitry 604 may include one or more instruction processor 618 and memory 620.

The memory 620 may be implemented as a non-transitory memory circuit and may store, for example, control instructions 622 for implementing the various functions described above, as well as an operating system 621. In one implementation, the processor 618 executes the control instructions 622 and the operating system 621 to carry out any desired functionality of the adaptive federated learning process above.

The computing device 600 may further include various data sources 630, or may be in communication with external data sources. Each of the databases that are included in the data sources 630 may be accessed by the various component of the disclosed system and its components.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein may be employed.

The method and system may also be embedded in a computer program product, which includes all the features enabling the implementation of the operations described herein and which, when loaded in a computer system, is able to carry out these operations. Computer program in the present context means any expression, in any language, code or notation, of a set of instructions intended to cause a system having an information processing capability to perform a particular function, either directly or after either or both of the following: a) conversion to another language, code or notation; b) reproduction in a different material form.

Many other modifications of the implementations above may be made to adapt a particular situation or material to the teachings without departing from the scope of the current disclosure. Therefore, it is intended that the present methods and systems not be limited to the particular embodiments disclosed, but that the disclosed methods and systems include all embodiments falling within the scope of the appended claims.

We claim:

1. A system comprising:
   a memory circuitry for storing computer instructions;
   a network interface circuitry; and
   a processor in communication with the network interface circuitry and the memory circuitry, the processor configured to execute the computer instructions to:
   retrieve a plurality of lists, each of the plurality of lists being associated with a selection event and comprising a set of data items among a data item pool selected by one of a plurality of entities for the selection event;
   generate, independent of identities of the plurality of entities, a cluster representation of the plurality of lists, based on a computerized pattern recognition algorithm;
   extract a subset of the plurality of lists associated with a target entity to form a target list set;
   automatically generate a ranking of one or more data items in the data item pool based on the cluster representation and the target list set;
   automatically generate a recommendation among the one or more data items for the target entity based on the ranking; and
   present, on a display device of a user equipment of the target entity, the subset of the plurality of lists with the generated recommendation for the target entity as a reduced presentation of a full menu.

2. The system of claim 1, wherein the cluster representation of the plurality of lists comprises a one or more list clusters, each of the one or more list clusters being associated with a subset of the plurality of lists.

3. The system of claim 2, wherein each of the one or more list clusters comprises a textual concatenation of data items included in the subset of the plurality of lists.

4. The system of claim 3, wherein the computerized pattern recognition algorithm is configured to cluster the plurality of lists based on inter-list similarities.

5. The system of claim 4, wherein the computerized pattern recognition algorithm comprises a K-mean computation.

6. The system of claim 3, wherein at least two subsets of the plurality of lists associated with different list clusters share a same list among the plurality of lists.

7. The system of claim 6, where to automatically generate a ranking of the one or more data items for the target entity comprises, for a current data item in the one or more data items, generate a data item ranking score associated with the target entity.

8. The system of claim 7, wherein the data item ranking score associated with the target entity for the current data item comprises a summation of cluster-wise sub-ranking scores for the target entity over each list cluster in a target list cluster set, the target list cluster set comprising list clusters among the one or more list clusters that include at least one list in the target list set.

9. The system of claim 8, wherein the cluster-wise sub-ranking score of the current data item for a current list cluster and associated with the target entity comprises a multiplication of at least:
   a list count representing a number of lists associates with the target entity in the current list cluster;
   a word count representing a number of times for at least one word in a textual form of the current data item appearing in the current list cluster; and
   a data item count representing a number of times the current data item appearing in the target list set.

10. The system of claim 9, wherein the cluster-wise sub-ranking score of the current data item for a current list cluster and associated with the target entity is generated by additional multiplying a feedback score maintained for the current data item and the target entity, the feedback score indicating an extent to which the current data item was previously recommended to and selected by the target entity.

11. The system of claim 10, wherein the processor is configured to execute the computer instructions further to:
    storing the recommendation under an entity identification of the target entity;
    after providing the recommendation to the target entity, monitor a selection of data items from the data item pool by the target entity;
    in response to a data item in listed in the recommendation being selected by the target entity, increment a feedback score associated with the data item and the target entity by a predetermined value.

12. A method comprising:
    retrieving a plurality of lists, each of the plurality of lists being associated with a selection event and comprising a set of data items among a data item pool selected by one of a plurality of entities for the selection event;
    generating, independent of identities of the plurality of entities, a cluster representation of the plurality of lists, based on a computerized pattern recognition algorithm;
    extracting a subset of the plurality of lists associated with a target entity to form a target list set;
    automatically generating a ranking of one or more data items in the data item pool based on the cluster representation and the target list set;
    automatically generating a recommendation among the one or more data items for the target entity based on the ranking; and
    present, on a display device of a user equipment of the target entity, the subset of the plurality of lists with the generated recommendation for the target entity as a reduced presentation of a full menu.

13. The method of claim 12, wherein the cluster representation of the plurality of lists comprises a one or more list clusters, each of the one or more list clusters being associated with a subset of the plurality of lists.

14. The method of claim 13, wherein each of the one or more list clusters comprises a textual concatenation of data items included in the subset of the plurality of lists.

15. The method of claim 14, wherein the computerized pattern recognition algorithm is configured to cluster the plurality of lists based on inter-list similarities.

16. The method of claim 13, wherein at least two subsets of the plurality of lists associated with different list clusters share a same list among the plurality of lists.

17. The method of claim 16, where automatically generating a ranking of the one or more data items for the target entity comprises, for a current data item in the one or more data items, generating a data item ranking score associated with the target entity.

18. The method of claim 17, wherein the data item ranking score associated with the target entity for the current data item comprises a summation of cluster-wise sub-ranking scores for the target entity over each list cluster in a target list cluster set, the target list cluster set comprising list clusters among the one or more list clusters that include at least one list in the target list set.

19. The method of claim 18, wherein the cluster-wise sub-ranking score of the current data item for a current list cluster and associated with the target entity comprises a multiplication of at least:
    a list count representing a number of lists associates with the target entity in the current list cluster;

a word count representing a number of times for at least one word in a textual form of the current data item appearing in the current list cluster; and a data item count representing a number of times the current data item appearing in the target list set.

20. A system comprising:

a memory circuitry for storing computer instructions;

a network interface circuitry; and a processor in communication with the network interface circuitry and the memory circuitry, the processor configured to execute the computer instructions to:

retrieve a plurality of lists, each of the plurality of lists being associated with a selection event and comprising a set of data items among a data item pool selected by one of a plurality of entities for the selection event;

clustering the data item pool to generate a plurality of data item clusters based on a pattern recognition algorithm to identify inter-item correlations and similarities according to the plurality of lists; at least one data item in the data item pool appearing in more than one of the plurality of data item clusters;

receiving an input data item from a target entity among the plurality of entities;

automatically identifying a reduced set of data item clusters that includes the input data item;

executing a term-frequency-inverse-document-frequency (TFIDF) algorithm with respect to the input data item and the reduced set of data item clusters to identify a set of candidate data items within the reduced set of data item clusters having TFIDF scores higher than a predefined threshold score; and generating, on a display device of a user equipment of the target entity, a recommendation including the set of candidate data items to the target entity in response to the target entity completing typing an input data item.

* * * * *